United States Patent [19]
Uchida et al.

[11] Patent Number: 5,935,617
[45] Date of Patent: Aug. 10, 1999

[54] MOLDING APPARATUS FOR PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 08/854,798

[22] Filed: May 12, 1997

Related U.S. Application Data

[63] Continuation of application No. 08/261,324, Jun. 16, 1994, abandoned.

[30] Foreign Application Priority Data

Jun. 16, 1993 [JP] Japan ..................................... 5-168335

[51] Int. Cl.$^6$ .................................................. B05C 19/04
[52] U.S. Cl. ...................... 425/134; 425/326.1; 425/388; 425/439; 425/446; 425/447
[58] Field of Search ..................................... 264/101, 109, 264/113, 112, 125, 135, 139, 154, 162, 239, 241, 245, 571, DIG. 31; 156/154; 428/143, 147, 156; 425/130, 134, 439, 446, 447, 388, 326.1, DIG. 60; 249/160

[56] References Cited

U.S. PATENT DOCUMENTS

| | | | |
|---|---|---|---|
| 3,941,636 | 3/1976 | Drout et al. | 264/112 |
| 5,047,187 | 9/1991 | Banus . | |
| 5,204,055 | 4/1993 | Sachs et al. | 264/113 |
| 5,368,791 | 11/1994 | Uchida et al. | 264/125 |
| 5,376,321 | 12/1994 | Uchida et al. . | |
| 5,387,380 | 2/1995 | Cima et al. | 425/130 |
| 5,429,676 | 7/1995 | Uchida et al. | 118/310 |
| 5,445,772 | 8/1995 | Uchida et al. . | |

FOREIGN PATENT DOCUMENTS

| | | |
|---|---|---|
| 0 479 512 | 4/1992 | European Pat. Off. . |
| 0 558 247 | 9/1993 | European Pat. Off. . |
| 0 558 248 | 9/1993 | European Pat. Off. . |
| 0 611 639 | 8/1994 | European Pat. Off. . |
| 2 117 007 | 7/1972 | France . |
| 2 596 706 | 10/1987 | France . |
| 51-2759 | 1/1976 | Japan . |
| 60-96410 | 5/1985 | Japan . |
| 2-92620 | 4/1990 | Japan . |
| 5-32468 | 2/1993 | Japan . |
| 5-84715 | 4/1993 | Japan . |
| 5-253910 | 10/1993 | Japan . |
| 904 037 | 8/1962 | United Kingdom . |
| 2 215 266 | 9/1989 | United Kingdom . |

*Primary Examiner*—Jan H. Silbaugh
*Assistant Examiner*—Kenneth M. Jones
*Attorney, Agent, or Firm*—Oblon, Spivak, McClelland, Maier & Neustadt, P.C.

[57] ABSTRACT

A molding apparatus for a patterned shaped article includes a retainer having a plurality of retaining portions for retaining particles, a supply tank for charging particles into the retainer, a remover for removing the particles from some of the retaining portions of the retainer, and another supply tank for charging particles of a different kind into the retaining portions from which the particles were removed. The apparatus produces a patterned shaped article by conducting at least one cycle of operation in which particles are charged into the retainer, the charged particles are removed from some of the retaining portions of the retainer and particles of a different kind are charged into the retaining portions from which the particles were removed, and the particles retained are released by the retainer to form a course of prescribed thickness on a base surface.

16 Claims, 23 Drawing Sheets

MOLDING APPARATUS FOR PATTERNED SHAPED ARTICLE

This application is a Continuation of application Ser. No. 08/261,324, filed on Jun. 16, 1994, now abandoned.

BACKGROUND OF THE INVENTION

1. Field of the Invention

This invention relates to a molding apparatus for patterned shaped articles and a method of using the molding apparatus for producing patterned concrete shaped articles, patterned artificial stone shaped articles, patterned raw products for sintering into ceramic shaped articles, patterned ceramic shaped articles, patterned metal shaped articles, patterned impasto shaped articles, patterned plastic shaped articles, patterned shaped foodstuffs and the like.

2. Description of the Prior Art

Up to now the only way available for providing a part of a surface, such as of paving blocks, with a pattern indicating a crosswalk, a stop sign or other such traffic control mark or for providing the entire surface of the blocks with a pattern has been to paint the surface with a coating material such as paint or to inlay the desired pattern.

Since the patterns painted on a part or all of the surface of paving blocks are exposed to abrasion from, for example, the shoes of pedestrians walking on the blocks and the tires of vehicles driving over them, they quickly wear off and have to be redone at frequent intervals. The amount of labor involved in this work is considerable. Where the pattern is formed by inlaying, the work itself is troublesome and very costly.

For readily producing patterned shaped articles that do not lose their surface patterns and do not become unsightly even when exposed to surface abrasion, the inventors previously proposed methods that use at least one member selected from among an auxiliary form matched to the pattern to be formed (Japanese Patent Public Disclosures No. 4-105903, No. 5-38707, No. 5-38708 and No. 5-238767 and U.S. Pat. No. 5,376,321), a cell body consisting of contiguous columnar subdivisions of equal height (Japanese Patent Public Disclosures No. 4-140104, No. 4-139083, No. 5-84715, No. 5-84714 and U.S. Pat. No. 5,368,791 and a bristling body consisting of a dense aggregation of upright bristles (Japanese Patent Public Disclosures No. 4-345803, No. 5-32468, No. 5-237816 and No. 5-237821 and U.S. Pat. No. 5,445,772).

The inventors also proposed a method of producing patterned shaped articles with markedly improved productivity comprising the steps of using an auxiliary form, a cell body or a bristling body to form a course of a first material to a prescribed thickness, removing a part of the first material course to form empty regions therein, and charging the empty regions with a second material (Japanese Laid Open Publication No. 5-253910and U.S. patent application Ser. No. 021,554).

One object of this invention is to provide a molding apparatus for patterned shaped articles and a method of producing patterned shaped articles able to produce desired patterns at high speed.

Another object of the invention is to provide a molding apparatus for patterned shaped articles and a method of producing patterned shaped articles readily adaptable to computer control and enabling all types of patterns to be produced using computer software.

SUMMARY OF THE INVENTION

For attaining these objects, the invention provides a molding apparatus for a patterned shaped article comprising a retainer having a plurality of retaining portions for retaining particles, means for charging particles into the retainer, means for removing the particles from some of the retaining portions of the retainer, and means for charging particles of a different kind into the retaining portions from which the particles were removed, the apparatus producing a patterned shaped article by conducting at least one cycle of operation in which particles are charged into the retainer, the charged particles are removed from some of the retaining portions of the retainer and particles of a different kind are charged into the retaining portions from which the particles were removed, and releasing the particles retained by the retainer to form a course of prescribed thickness on a base surface.

This invention further provides a method of producing a patterned shaped article using the aforementioned apparatus, comprising the steps of charging dry particles into retaining portions of a retainer having a plurality of retaining portions, removing the charged particles from some of the retaining portions of the retainer, charging particles of a different kind into the retaining portions from which the particles were removed, optionally conducting one or more additional cycles of said particle charging, removal and recharging, and then releasing the particles retained by the retainer to form a course of prescribed thickness on a base surface.

As is clear from the foregoing, the pattern course corresponding to the background, which accounts for a large part of the overall pattern area, is formed all at one time by charging of the first kind of particles, the ensuing particle removal is conducted at high speed by dropping, suction or blowing of air, and the charging of the second particles into the vacated portions is conducted quickly thereafter. It thus becomes possible to form a particle course having a desired pattern on the base surface at a much higher speed than possible by the prior art.

In addition, a computer can be connected with the particle supply and removal devices and programmed to conduct the charging and removal of particles for automatically forming a particle course having a desired pattern on the base surface.

The above and other objects, characteristic features and advantages of this invention will become apparent to those skilled in the art from the description of the invention given herein below with reference to the accompanying drawings.

DESCRIPTION OF THE PREFERRED EMBODIMENTS

As explained of the foregoing, the retainers usable by this invention include at least the auxiliary form, cell form and bristling form proposed previously by the inventors. These retainers can be used in the molding apparatus in a freely movable state, vertically or horizontally movable state, invertible state or endless state. Since the three types of retainers can be arranged in any of these four states depending on the pattern to be produced, at least 12 combinations are possible. In the interest of brevity, only seven of the various possible arrangements will be explained in the following discussion with reference to FIGS. 1 to 42. In addition, since each of the aforesaid 12 or more arrangements of the molding apparatus for patterned shaped articles can be combined with suction-removal, blow-removal and drop-removal, the number of combinations increases to at least 36 and each of these can be combined with plural numbers of charge and removal cycles, use of a mask, and various other devices and auxiliary equipment. Although the number of combinations therefore becomes very large, the description will be limited to the examples shown in FIGS. 1 to 42. It should be understood, however, that the invention is not limited to the illustrated embodiments. The aforesaid auxiliary form can be constituted in a continuous manner from a continuous sheet, plate material or the like following the profile of the pattern or can be formed in a discontinuous manner as a row of appropriately spaced upright members such as pins, small pieces or tubes, or from processed fiber as implanted, raised or attached hairs, or as pile or loops.

Although the particles supplied to the retainer are dry, they may have absorbed one or more of water, oil, lubricant-bonding agent, solvent, a setting agent or plasticizer, if they are not kneaded with water, oil, lubricant-bonding agent, a solvent setting agent or plasticizer and are in a dry state readily amenable to pulverization for supply to the base surface. The particles are such that the shaped article formed by supplying them into the retainer does not lose its shape when the retainer is removed from the base surface.

Figure 1:
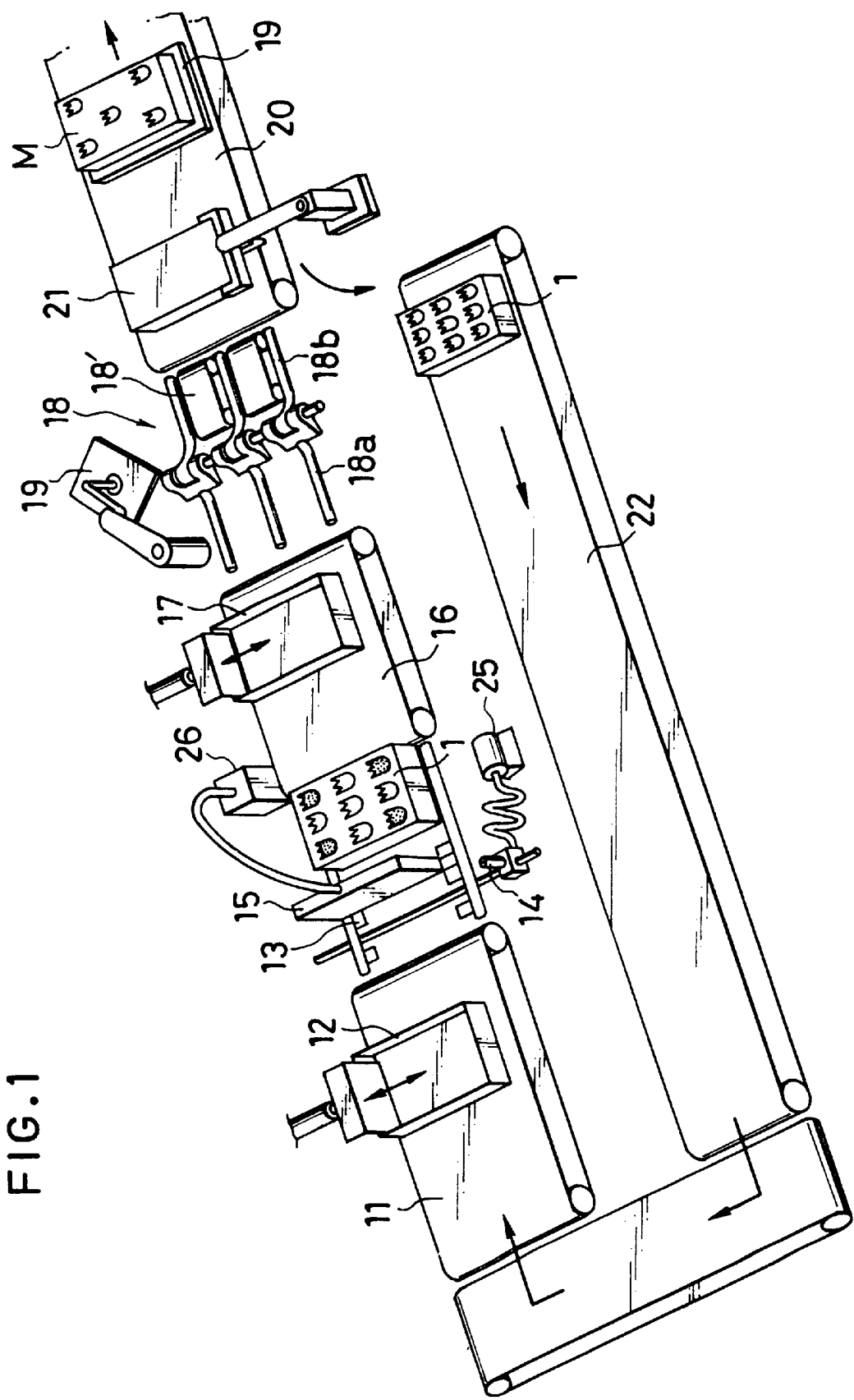
FIG. 1 is a schematic perspective view of a first embodiment of the molding apparatus for patterned shaped articles according to the invention.
Figure 2:
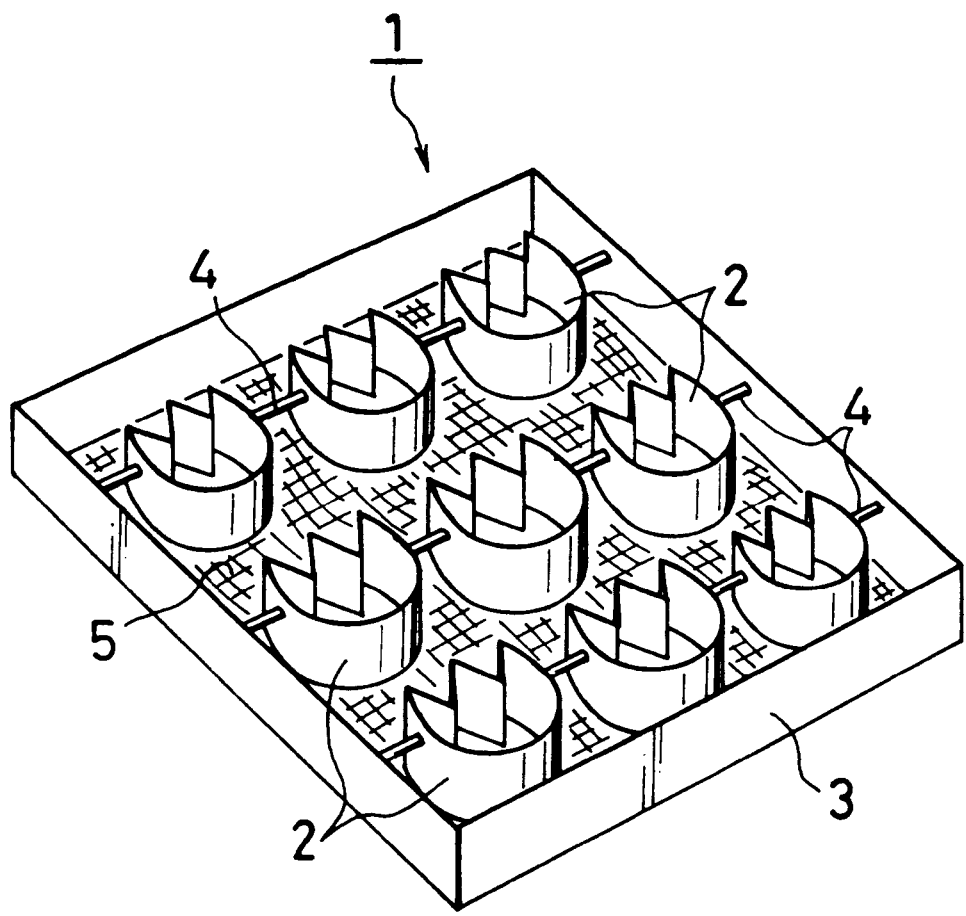
FIG. 2 is an enlarged view of a retainer used in the apparatus of FIG. 1.
Figure 3:
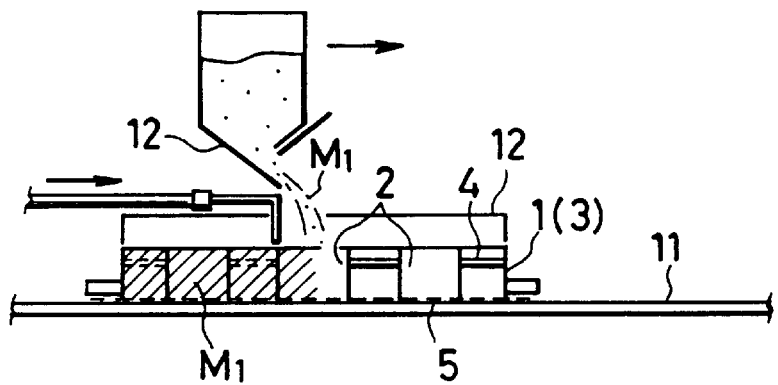
FIG. 3 is an explanatory view showing primary charging of particles into the retainer of FIG. 2.
Figure 4:
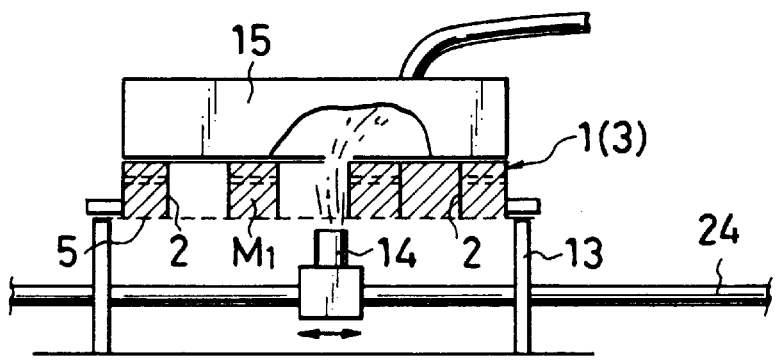
FIG. 4 is an explanatory view showing blow-removal of particles charged into the retainer.
Figure 5:
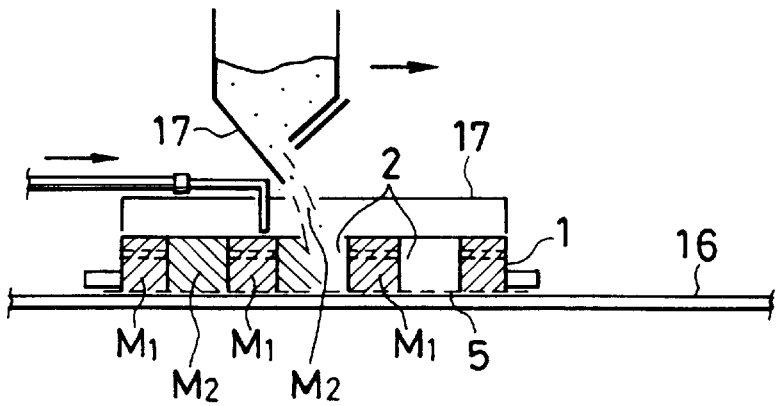
FIG. 5 is an explanatory view showing secondary charging of particles into the portion of the retainer from which particles were removed.
Figure 6:
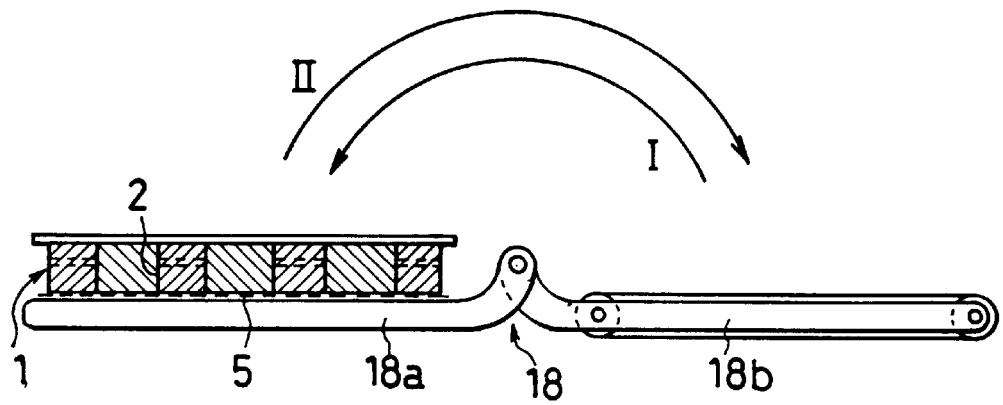
FIG. 6 is an explanatory view of an invertor of the molding apparatus of FIG. 1.
Figure 7:
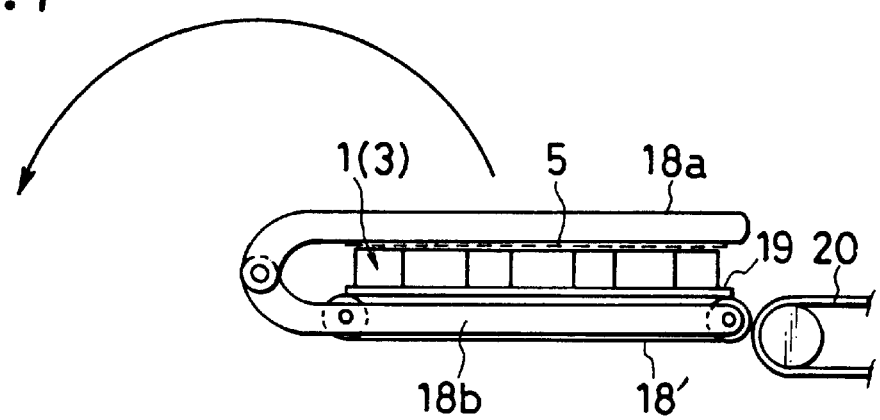
FIG. 7 is an explanatory view showing how the invertor of FIG. 6 inverts the retainer.
Figure 8:
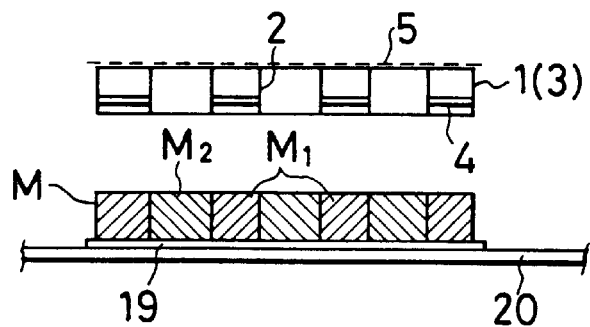
FIG. 8 is an explanatory view showing how a particle course is removed from the retainer of the molding apparatus of FIG. 1.

The molding apparatus illustrated in FIGS. 1 to 8 has a freely movable retainer 1 consisting of nine of the flower pattern auxiliary forms 2 shown in FIG. 2 joined by rods 4 and fixed within a peripheral frame 3. The bottom of the retainer 1 is covered with an unwoven cloth 5. The retainer 1 is first placed on a belt conveyor 11 and particles $M_1$ are charged into it by a squeegee type supply tank 12 (FIG. 3) which, together with a frame 12' and movable blade 12" form a discharging means or mechanism. The retainer 1 is then transferred to a conveyor section 13 equipped with guides on both sides, where it passes over a scan guide 24 located under the conveyor section 13. The particles $M_1$ in some or all of the auxiliary forms 2 are then blown upward by a stream of air issuing from a nozzle 14 connected with a compressor 25 and passing upward through the unwoven cloth 5. The upwardly blown particles are sucked into a slit-like suction port 15 (FIG. 4). The retainer 1 partially removed of particles then moves onto a conveyor 16 where a squeegee type supply tank 17, which together with a frame 17' and movable blade 17" form a discharging means or mechanism charges the empty auxiliary forms 2' with particles $M_2$ of a different kind from the particles charged into the auxiliary forms 2 previously (FIG. 5). The retainer 1 then advances to an invertor 18 where a retaining plate 19 destined to become a base surface is placed on its upper surface (FIG. 6). It is then caught between a fork-shaped invertor arm 18a and a fork-shaped presser arm 18b which turn it upside down (FIGS. 6, 7), and the resulting particle course (shaped article) M resting on the inverted retaining plate (base surface) 19 is transferred to a discharge conveyor 20 by a conveyor 18' built into the presser arm 18. The retainer 1 is then removed by a removing device 21 (FIG. 8) and the removed retainer 1 is sent back to the first belt conveyor 11 by a return conveyor 22, while the shaped article M constituted by the particle course formed by the retainer 1 is forwarded to the following processing step. In the interest of brevity, no detailed description will be given regarding the drive mechanisms for the squeegees, conveyors and invertor, the drives of the electric gates, the particle tanks that feed the particle supply tanks, or the like. It should also be noted that the auxiliary forms are not limited to the flower pattern ones of FIG. 2 and can be of various other shapes instead. Further, it is possible to replace the retaining plate 19 with a form that is just enough larger than the retainer 1 to enclose it snugly. Then, after the retainer has been inverted and removed, the particle course can be forwarded to the next processing step as contained in the form. In this case, the floor of the form serves as the base surface. From this it will be understood that various types of base surfaces can be employed as is convenient in light of the nature of the processes to follow.

FIGS. 9 to 14 relate to a modification of the apparatus of FIG. 1 in which the removal of the particles $M_1$ from some or all of the auxiliary forms during formation of the shaped article is achieved by causing the particles $M_1$ to fall out of the auxiliary form (herein referred to as "drop-removal").

Figure 9:
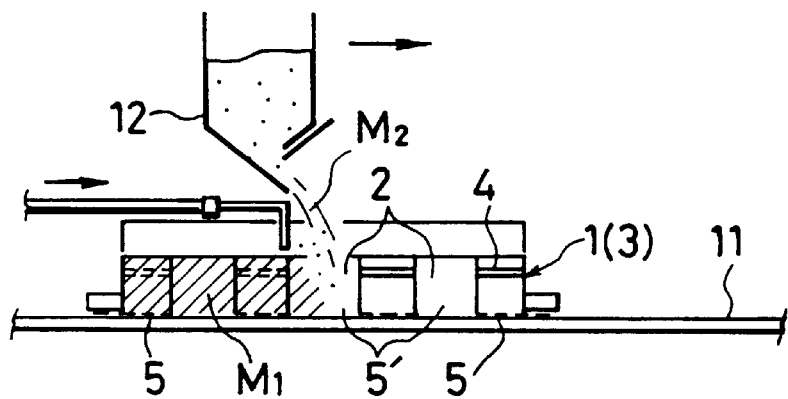
FIG. 9 is an explanatory view showing primary charging of particles into a retainer using a molding apparatus similar to that of FIG. 1.
Figure 10:
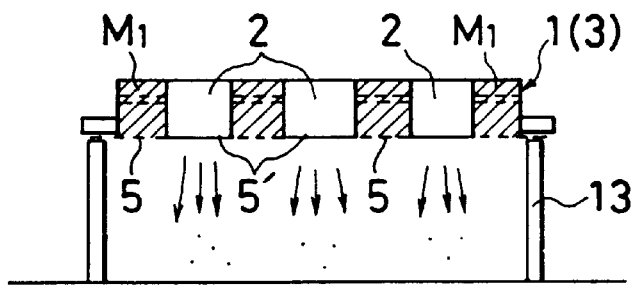
FIG. 10 is an explanatory view showing drop-removal of particles charged into a retainer.
Figure 11:
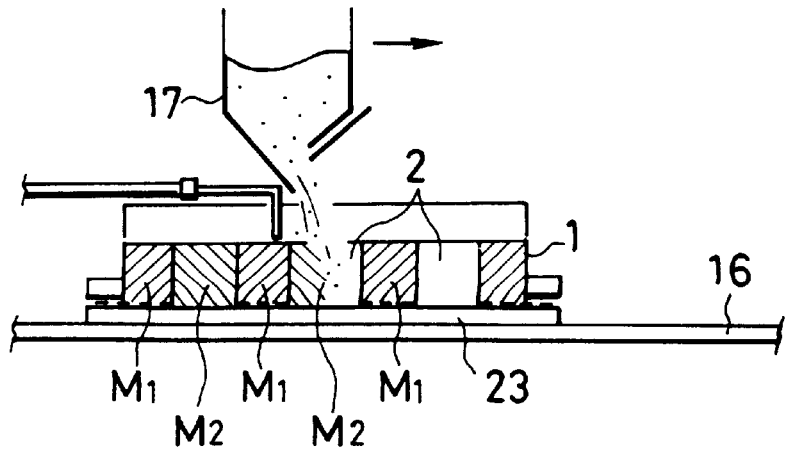
FIG. 11 is an explanatory view showing secondary charging of particles into the portion of the retainer from which particles were removed.
Figure 12:
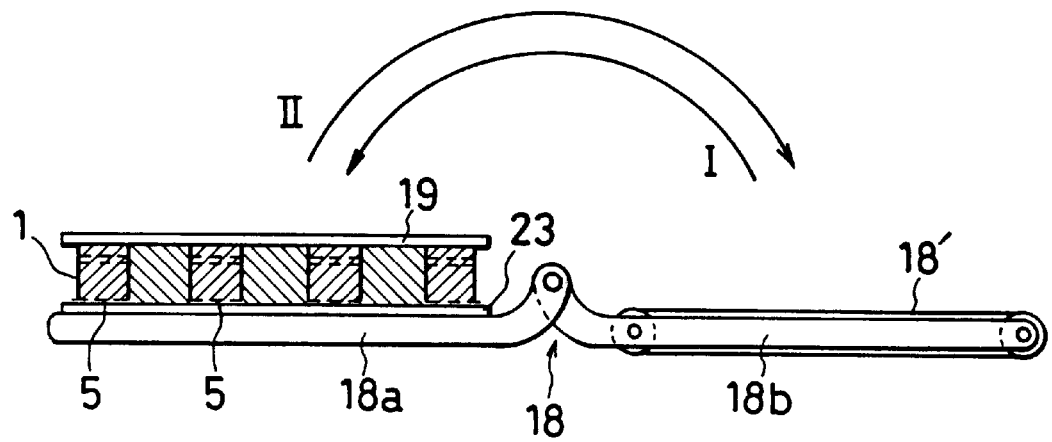
FIG. 12 is an explanatory view showing a retainer that has been secondarily charged with particles and placed on the invertor.
Figure 13:
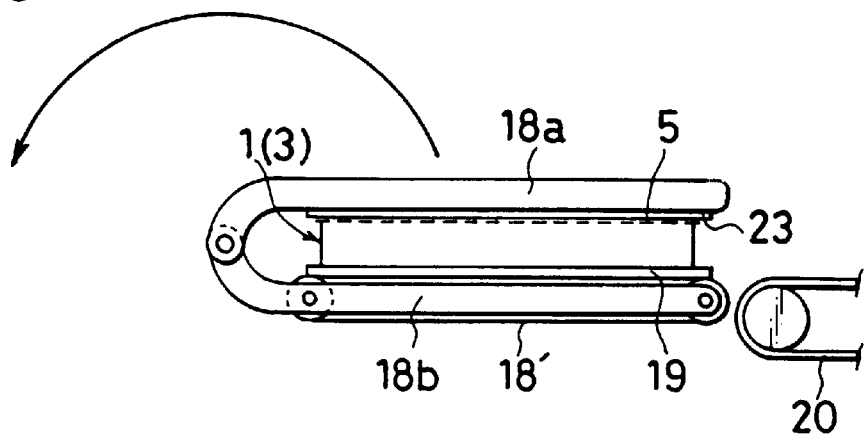
FIG. 13 is an explanatory view showing how the invertor of FIG. 12 inverts the retainer.
Figure 14:
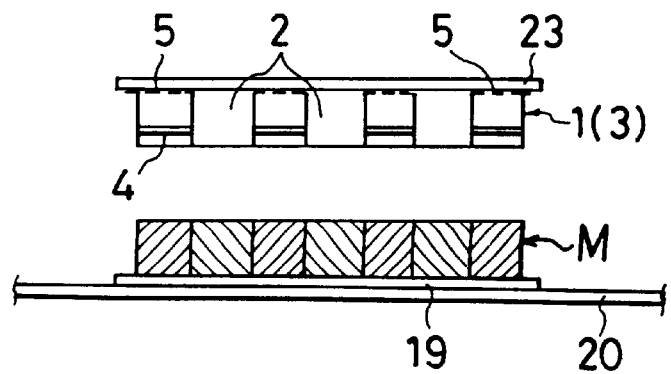
FIG. 14 is an explanatory view showing how a particle course is removed from the inverted retainer.

In this case, the unwoven cloth 5 closing the bottom of the retainer 1 is cut away to form holes 5' at portions corresponding to the bottoms of some or all of the auxiliary forms 2 for producing the pattern. The retainer 1 is first placed on the belt conveyor 11 and particles $M_1$ are charged into it by the squeegee type supply tank 12 (FIG. 9). The retainer 1 is then transferred to the conveyor section 13 equipped with guides on both sides, where the particles $M_1$ in the auxiliary forms with the holes 5' are allowed to fall out through the holes (FIG. 10). A handling robot (not shown) located between the conveyor section 13 and the conveyor 16 to which the retainer is to be next transferred first places a provisional bottom plate 23 on the conveyor 16 and then places the retainer 1 with some particles $M_1$ still remaining therein on the provisional bottom plate 23. The squeegee type supply tank 17 then charges the auxiliary forms with particles $M_2$ of a different kind from the particles $M_1$ (FIG. 11). The retainer 1 then advances to the invertor 18 where a retaining plate 19 destined to become a base surface is placed thereon. As in the preceding embodiment, it is then caught between the fork-shaped invertor arm 18a and the fork-shaped presser arm 18b which turn it upside down (FIGS. 12, 13), whereafter the provisional bottom plate 23 and the retainer 1 are removed (FIG. 14) and the resulting shaped article M is forwarded to the following processing step.

When this drop-removal method is employed, the air nozzle 14 and the suction port 15 can be omitted.

In a similar manner, the invention also permits the adoption of various other removal methods and the use of additional robots.

Figure 15:
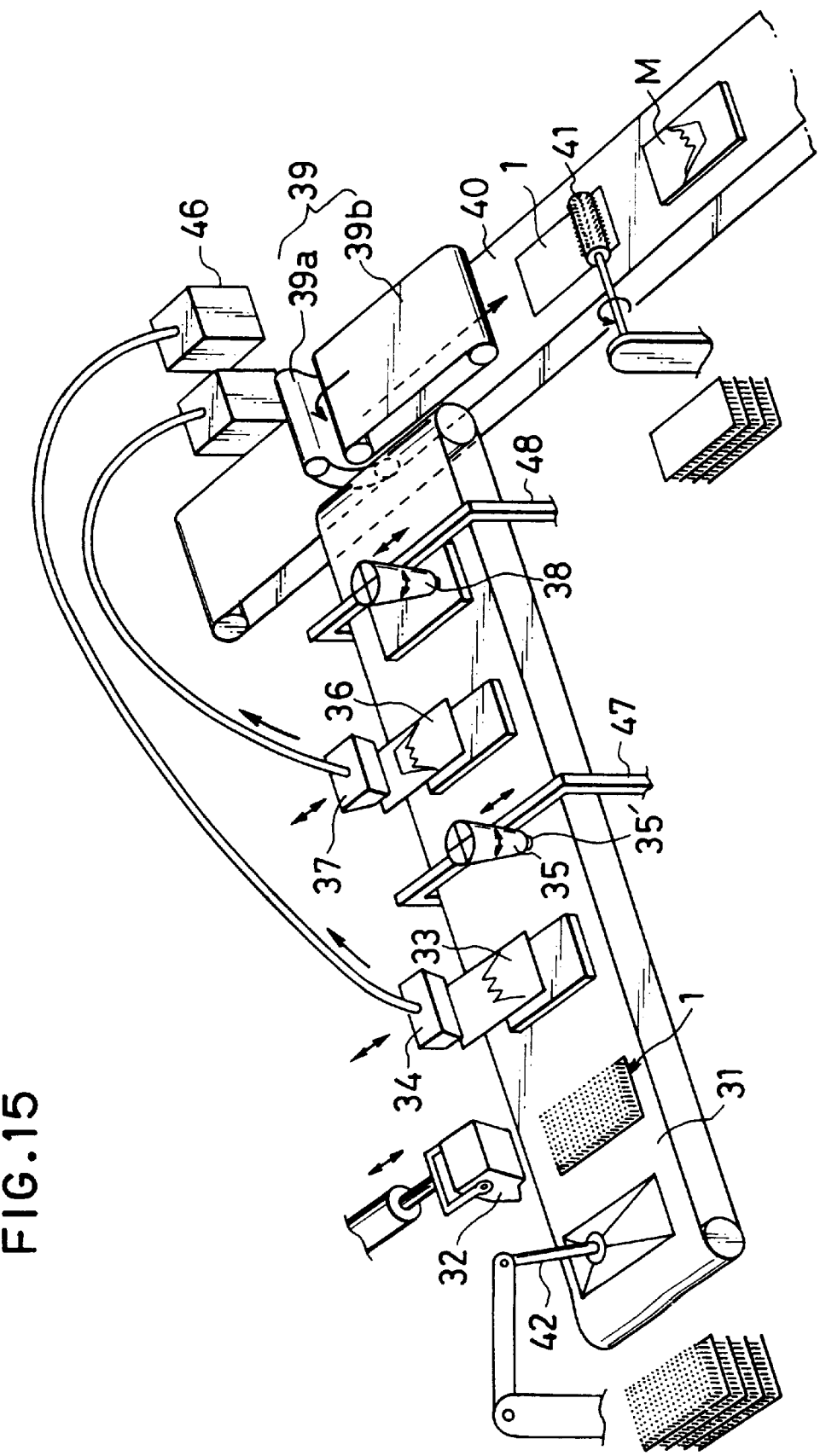
FIG. 15 is a schematic bird's-eye view of a second embodiment of the molding apparatus for patterned shaped articles according to the invention.
Figure 16:
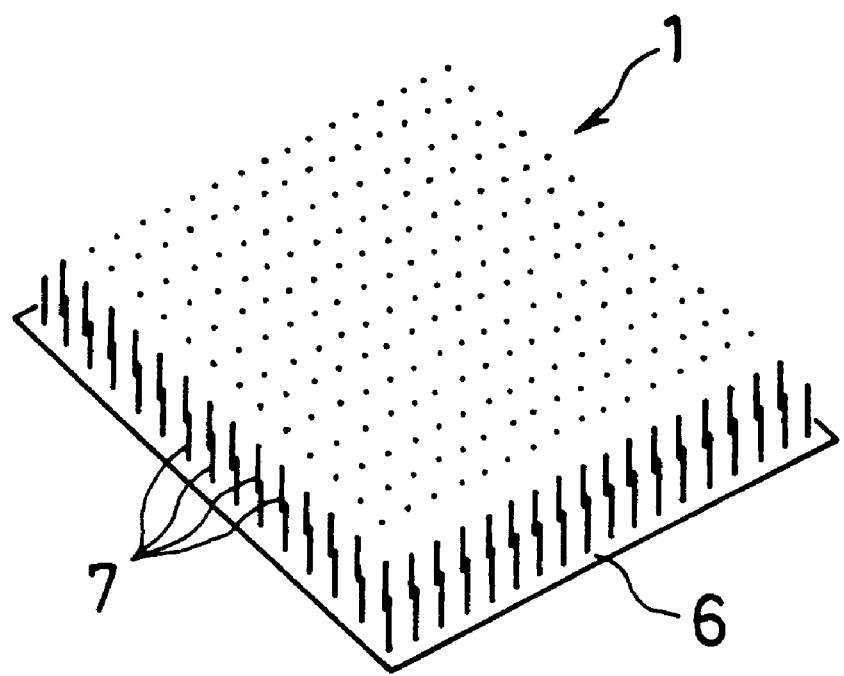
FIG. 16 is an enlarged view of a retainer used in the apparatus of FIG. 14.
Figure 17:
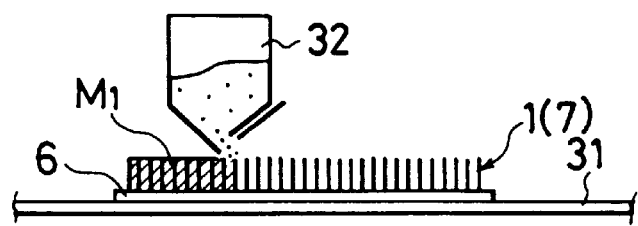
FIG. 17 is an explanatory view showing primary charging of particles into the retainer of FIG. 16.
Figure 18:
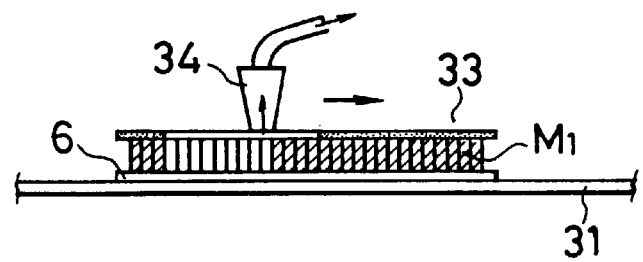
FIG. 18 is an explanatory view showing primary suction-removal of particles charged into the retainer.
Figure 19:
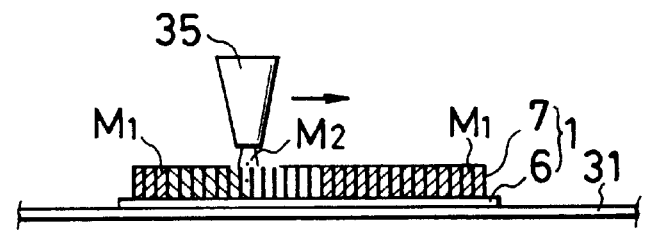
FIG. 19 is an explanatory view showing secondary charging of particles into the portion of the retainer from which particles were removed.
Figure 20:
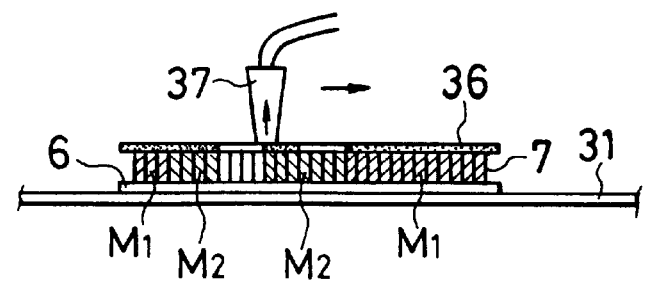
FIG. 20 is an explanatory view showing secondary suction-removal of particles charged into the retainer.
Figure 21:
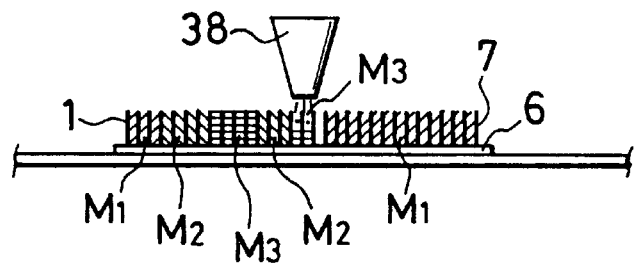
FIG. 21 is an explanatory view showing tertiary charging of particles into the portion of the retainer from which particles were removed.
Figure 22:
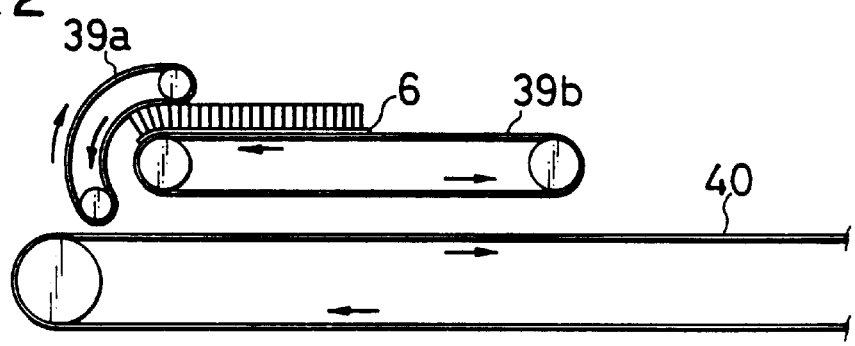
FIG. 22 is an explanatory view of the invertor of the molding apparatus of FIG. 15.
Figure 23:
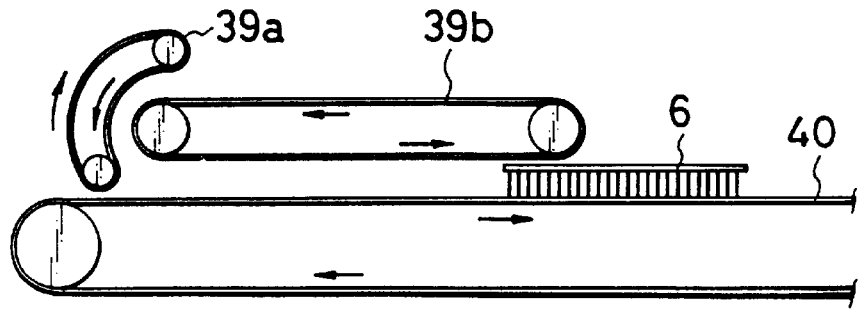
FIG. 23 is an explanatory view showing how the invertor of FIG. 22 inverts the retainer.

FIGS. 15 to 23 show a second embodiment of the molding apparatus for patterned shaped articles according to the invention. A square bristling body, which, as shown in FIG. 16, consists of a sheet 6 covered with dense bristles 7, is placed on a conveyor 31 by a retainer supply device 42 to serve as a retainer 1, and the retainer 1 is charged with first particles $M_1$ by a traveling supply tank 32 (FIG. 17). The retainer 1 then advances to a suction-removal station where a sheet-like mask 33 is placed over the retainer 1 and the first particles $M_1$ are sucked out from some parts of the bristling body through openings in the mask by moving a slit-like suction port 34 connected with an aspirator 46 over the mask 33 (FIG. 18). The retainer 1 next passes under a bridge-like frame 47 which straddles the conveyor 31 and supports a traveling supply tank 35 capable of holding four colors of particles. The supply tank 35 is equipped with a supply nozzle 35' having an electric gate. The portions of the retainer 1 from which particles have been removed are charged with second particles $M_2$ by the supply nozzle 35' as the supply tank 35 scans over the retainer 1 (FIG. 19). The retainer 1 then advances to the next station where a part of the first and/or second particles are removed by suction using a mask 36 and a slit-like suction port 37 (FIG. 20) and then to the following station where portions thereof removed of first or second particles are charged with third particles $M_3$ by a four-color particle supply tank 38 traveling on a bridge-like frame 48 (FIG. 21). The retainer 1 is then transferred to an invertor 39. The invertor 39 consists of two conveyors 39a, 39b which catch the retainer 1 between them, turn it upside down and deposit it on the base surface of a discharge conveyor 40 (FIGS. 22, 23), whereafter the retainer 1 is removed by a winder type removal device 41. The removed retainer 1 is returned to the head of the first conveyor 31, while the particle course (raw product) is forwarded to the following processing step. In the interest of brevity, no detailed description will be given regarding the drive mechanisms for the supply tanks, conveyors and invertor, the drives of the electric gates, suction-removal devices, retainer and mask loading devices or the like, an optional vibrator, the particle tanks that feed the particle supply tanks, or the like. The optional vibrator is for vibrating the retainer at the time of its removal so as to ensure neat extraction. In addition, opening the gaps between the bristles of the bristling body constituting the retainer releases powder bridges and enables smooth removal. While FIG. 16 shows bristles of the bristling body to be in the form of pins, this is only for facilitating the explanation and it is alternatively possible to use bristles of various other shapes.

Figure 24:
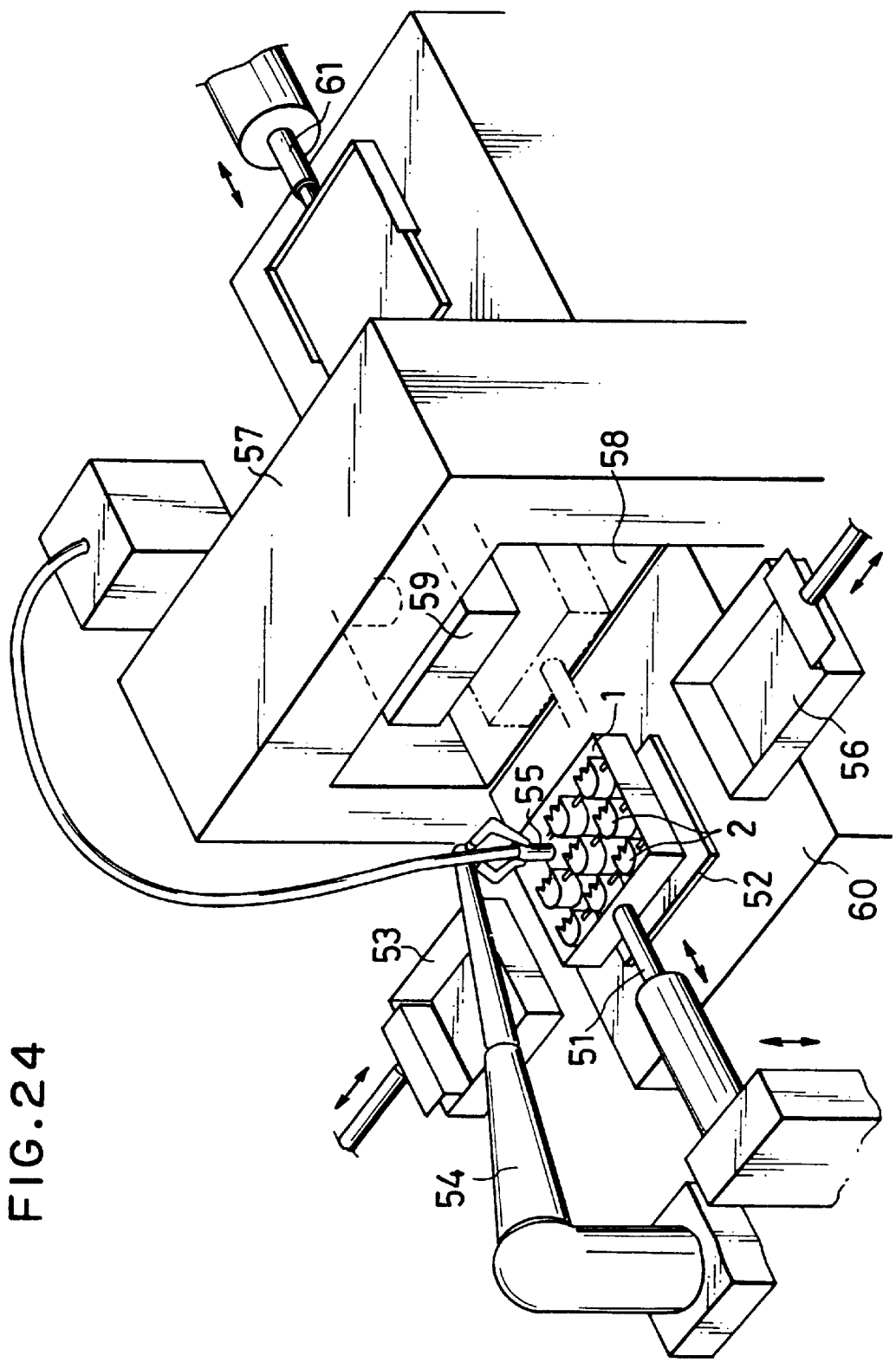
FIG. 24 is a schematic view of a third embodiment of the molding apparatus for patterned shaped articles according to the invention.
Figure 25:
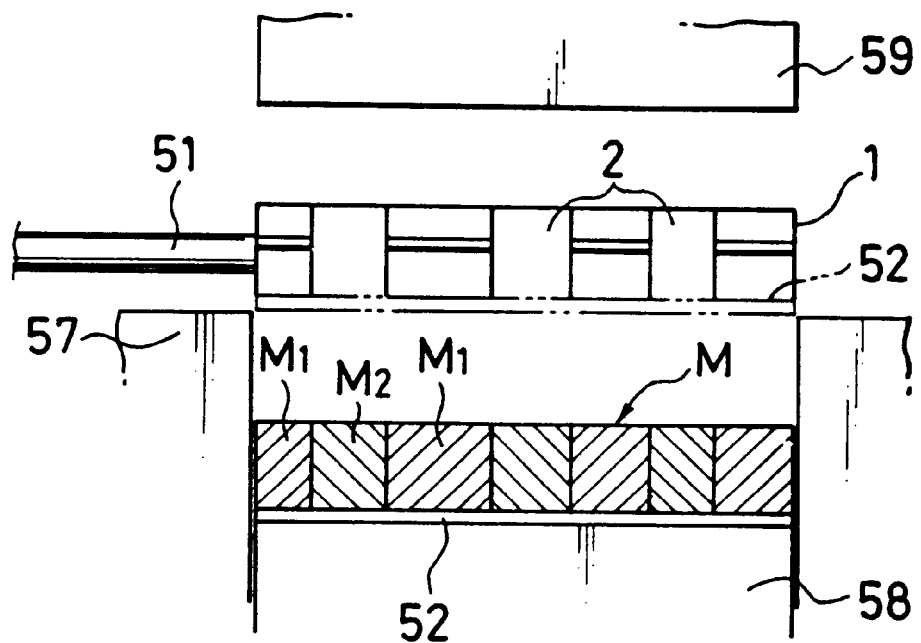
FIG. 25 is an explanatory view showing how a particle course is removed from the retainer inside a press of the molding apparatus of FIG. 24.
Figure 26:
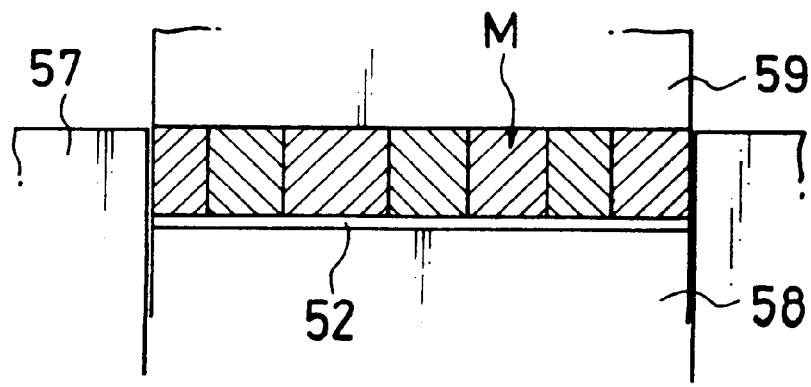
FIG. 26 is an explanatory view of how a particle course removed from the retainer is compressed.

A third embodiment of the molding apparatus for patterned shaped articles according to the invention is shown in FIGS. 24 to 26. In the illustrated molding operation, the apparatus uses a retainer 1 which, like the one shown in FIG. 2, consists of nine flower pattern auxiliary forms 2 joined by rods 4 and fixed within a peripheral frame 3. The retainer 1, which is open at the top and bottom, is held by a support arm 51 capable of moving vertically as well as forward and backward in the direction of the arrows. A bottom plate (base surface) 52 is slid to a predetermined position on a table 60 beforehand and the support arm 51 lowers the retainer 1 and fits it over the bottom plate 52. A squeegee type supply tank 53 then moves in from the right to charge the retainer 1 with particles $M_1$, the particles $M_1$ charged in some or all of the auxiliary forms 2 are sucked out by a suction nozzle with electric gate 55 supported on a robot arm 54, and the auxiliary forms removed of particles are charged with different type particles $M_2$ by a squeegee type supply tank 56 that moves in from the left. After charging of the particles $M_2$, the support arm 51 pushes the retainer 1 and the bottom plate 52 forward onto the lower die 58 of, for example, a double action press 57, the lower die 58 of the press is lowered to lower the bottom plate 52 and the particles $M_1$, $M_2$ together therewith (FIG. 25), the retainer 1, which was not lowered, is taken out of the press by upward and rearward movement of the support arm 51, the upper die 59 of the double action press 57 is lowered and the lower die 58 thereof raised to compress the particle course constituted of the particles $M_1$ and $M_2$ into a row product (FIG. 26), the raw product is removed by an unloading device 61 located on the opposite side of the press, and the bottom plate 52 is slid back from the unloading device 61 to its position at the start of the operation. In the interest of brevity, no detailed description will be given regarding the drive mechanisms of the squeegees, arms, robots, aspirator, gate, unloading device, double action press or the like, an optional vibrator or other auxiliary devices. The auxiliary forms are not limited to the illustrated flower pattern ones and can be of various other shapes instead.

Figure 27:
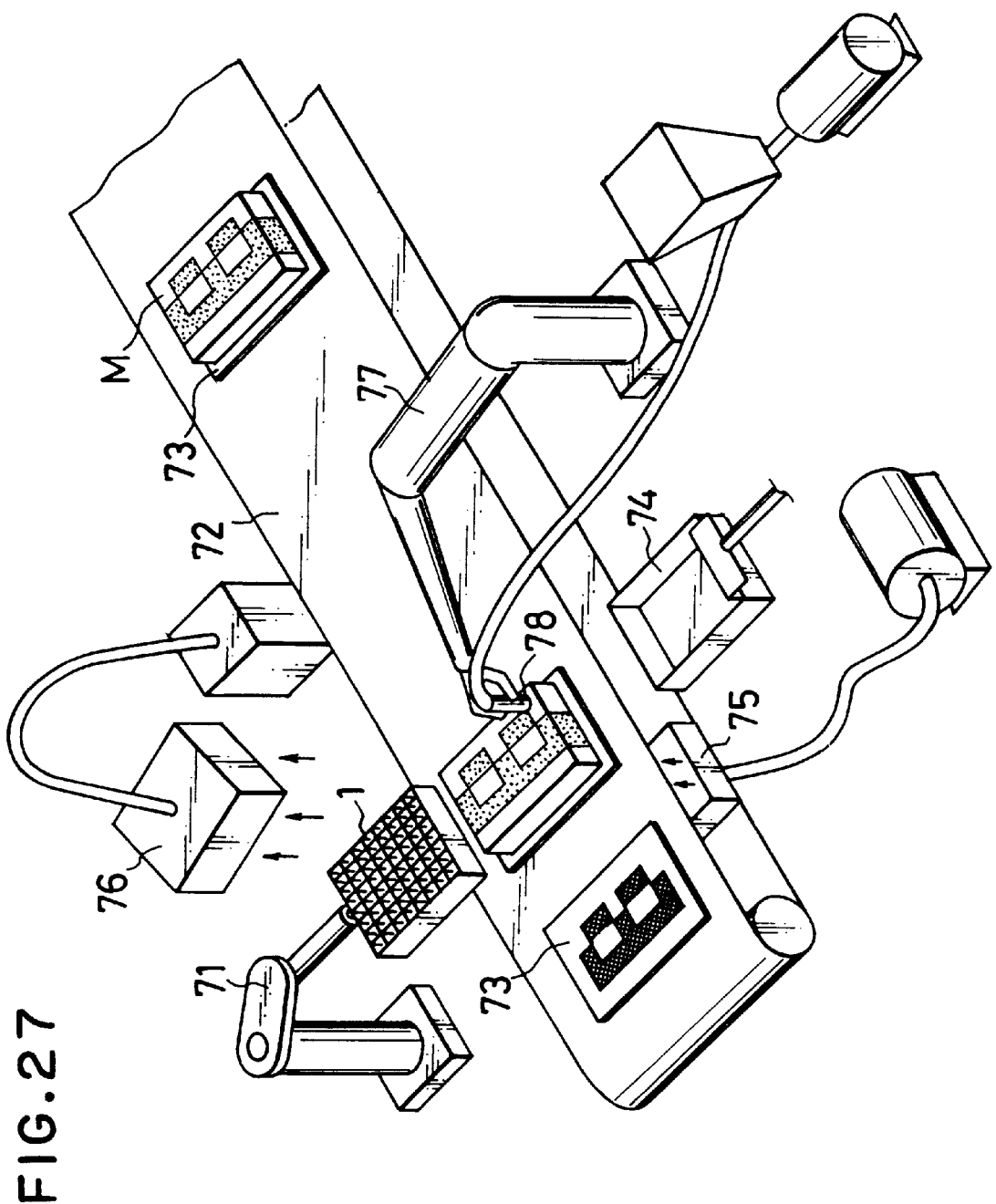
FIG. 27 is a schematic perspective view of a fourth embodiment of the molding apparatus for patterned shaped articles according to the invention.
Figure 28:
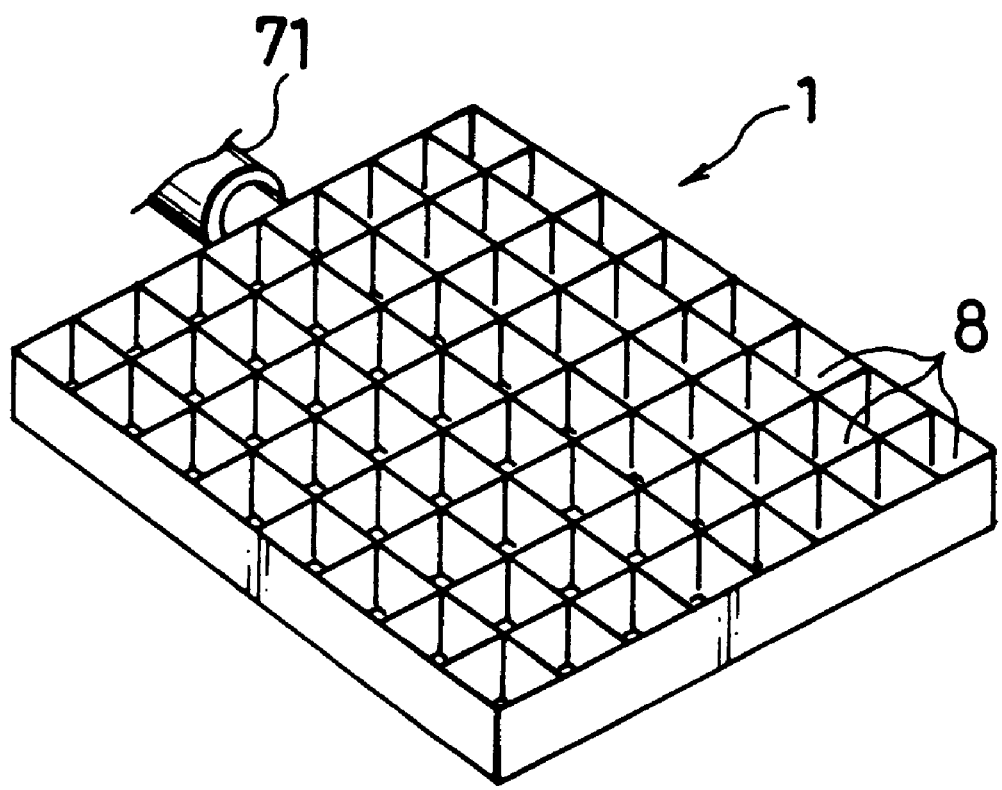
FIG. 28 is an enlarged view of a retainer used in the apparatus of FIG. 27.
Figure 29:
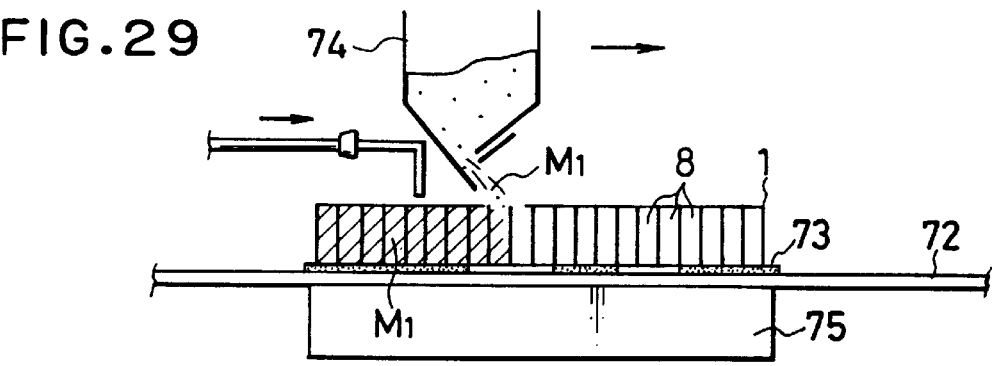
FIG. 29 is an explanatory view showing primary charging of particles into the retainer of FIG. 28.
Figure 30:
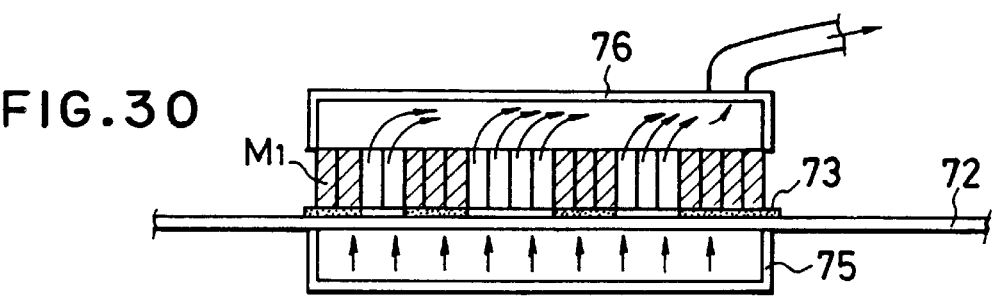
FIG. 30 is an explanatory view showing primary blow-removal of particles charged into the retainer.
Figure 31:
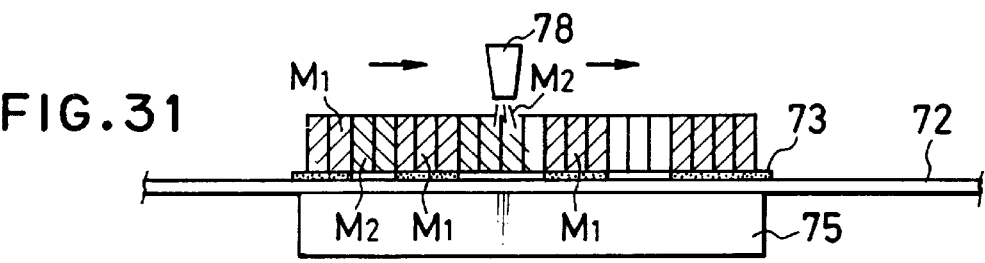
FIG. 31 is an explanatory view showing secondary charging of particles into the portion of the retainer from which particles were removed.
Figure 32:
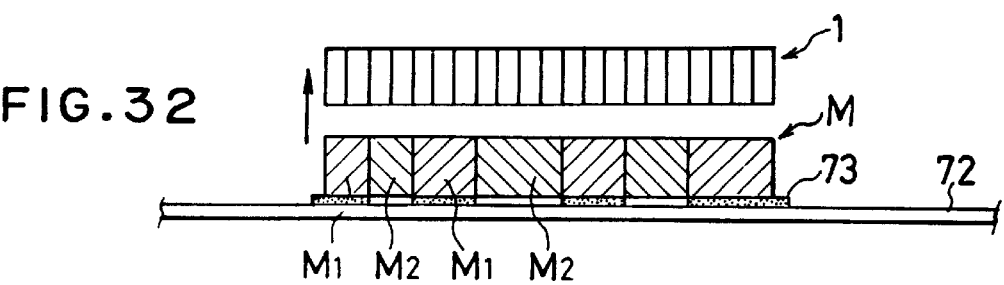
FIG. 32 is an explanatory view showing how a particle course is removed from the retainer.

FIGS. 27 to 32 show a fourth embodiment of the molding apparatus for patterned shaped articles according to the invention. The apparatus uses a retainer 1 constituted as an aggregation of contiguous columnar subdivisions (cells) 8 of equal height. As shown in FIG. 28, the retainer 1 is an 8×8 matrix of square cells 8 that are open at the top. As shown in FIG. 27, it is initially held over an air-permeable conveyor 72 made of air-permeable mesh by a support arm 71 capable of vertical movement. The support arm 71 lowers it onto a mask 73 being conveyed on the air-permeable conveyor. The mask 73, which is fabricated by imparting a mask pattern to a piece of unwoven cloth, serves as the base surface. Next, a squeegee type supply tank 74 moves in from the opposite side and charges the cells 8 of the cell form constituting the retainer 1 with particles $M_1$ (FIG. 29). Then, with the retainer 1 still in the same position, air is blown from a blow duct 75 connected with a compressor. As a result, a stream of air passes upward through the mesh conveyor 72 and the openings in the mask 73 and blows the particles $M_1$ out of the unmasked cells. A suction duct 76 connected via a pipe with an aspirator is lowered over the retainer 1 just prior to the blowing operation for sucking up the blown up particles (FIG. 30). The empty cells of the retainer 1 are then charged with a different kind of particles $M_2$ which are delivered by compressed air through a supply nozzle 78 equipped with an electric gate and connected with a supply tank and a compressor via a pipe (FIG. 31). Upon completion of this secondary charging, the retainer 1 is removed upward by the support arm 71 (FIG. 32) and the remaining mask 73 and particle course M are forwarded to the following processing step. In the interest of brevity, no detailed description will be given regarding the drive mechanisms of the conveyors, squeegees, arms, robots, duct, gate or the like, an optional vibrator or other auxiliary devices. Although FIG. 28 shows the retainer 1 to be an 8×8 cell matrix, matrices with various other numbers of cells and cell arrangements can be used instead.

Figure 33:
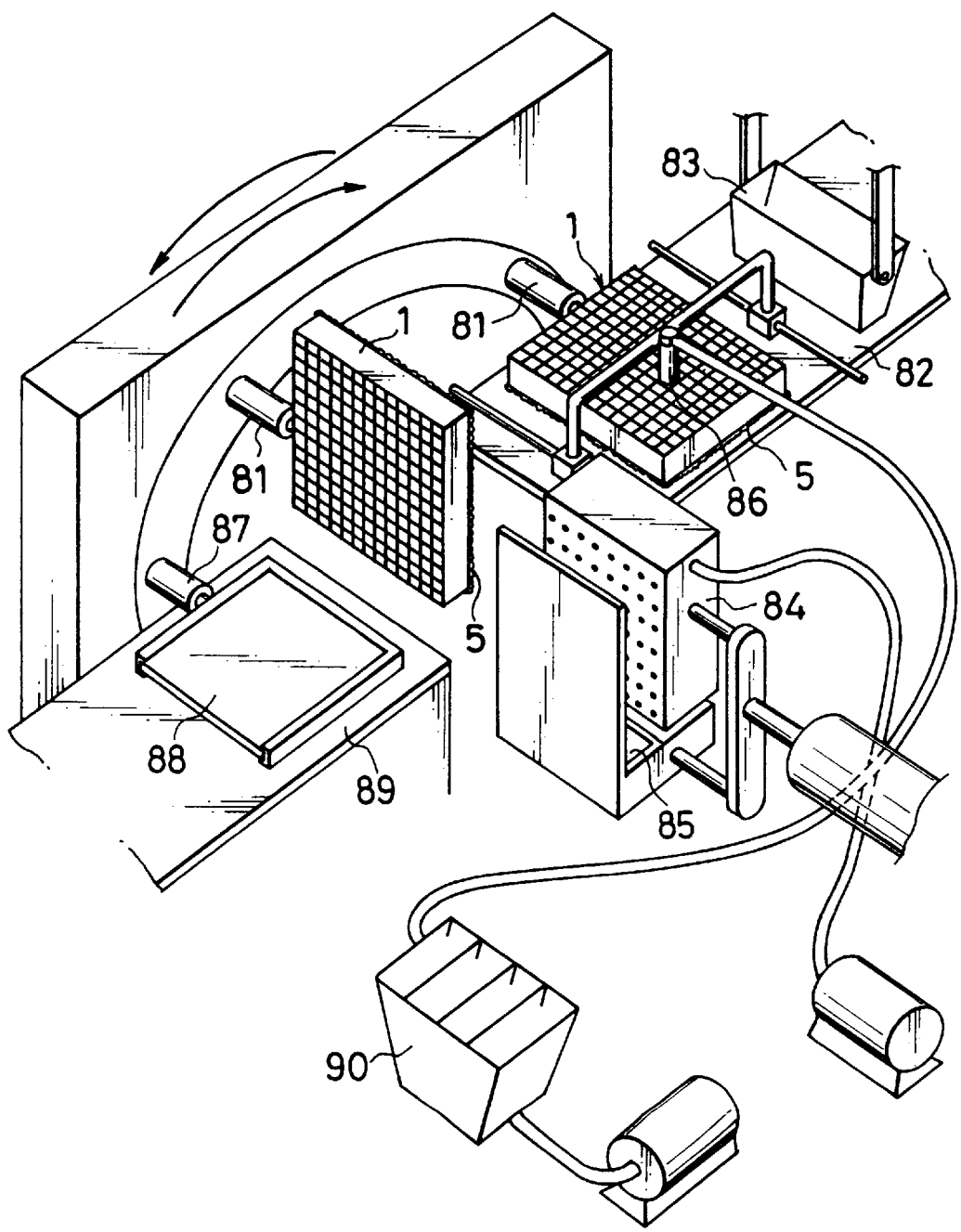
FIG. 33 is a schematic perspective view of an essential portion of a fifth embodiment of the molding apparatus for patterned shaped articles according to the invention.
Figure 34:
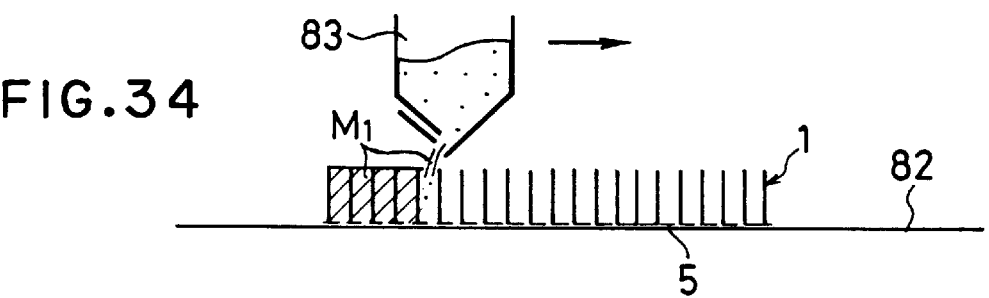
FIG. 34 is an explanatory view showing primary charging of particles into the retainer of the molding apparatus of FIG. 33.
Figure 35:
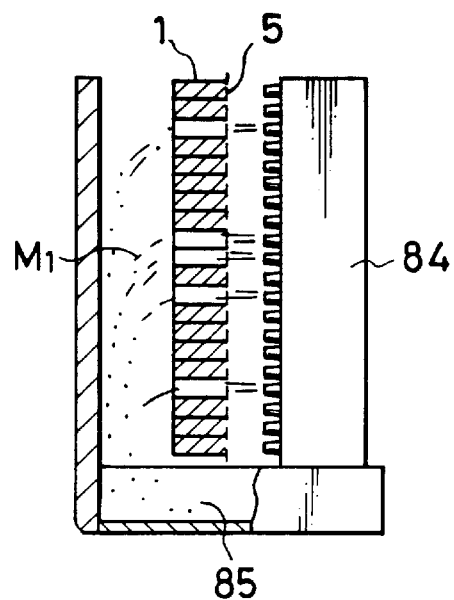
FIG. 35 is an explanatory view showing primary blow-removal of particles charged into the retainer.
Figure 36:
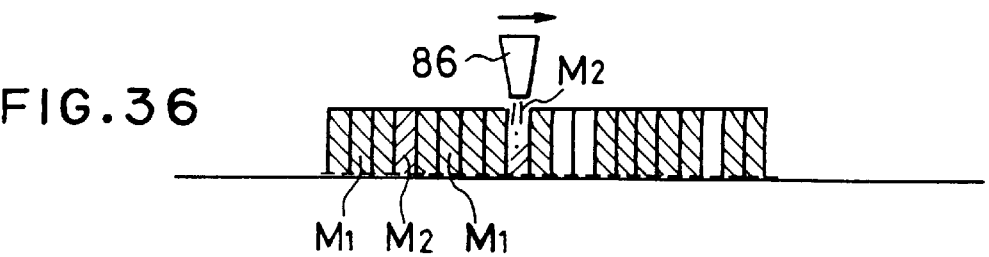
FIG. 36 is an explanatory view showing secondary charging of particles into the portion of the retainer from which particles were removed.
Figure 37:
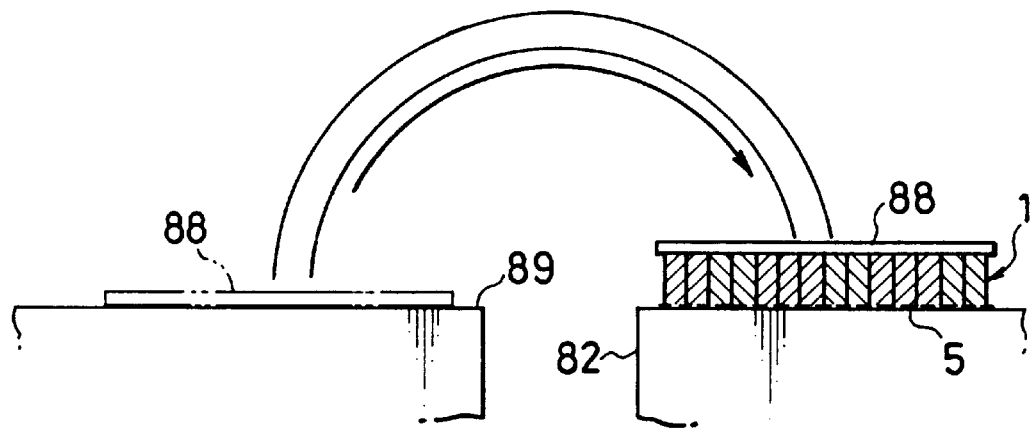
FIG. 37 is an explanatory view of the invertor of the molding apparatus of FIG. 33.
Figure 38:
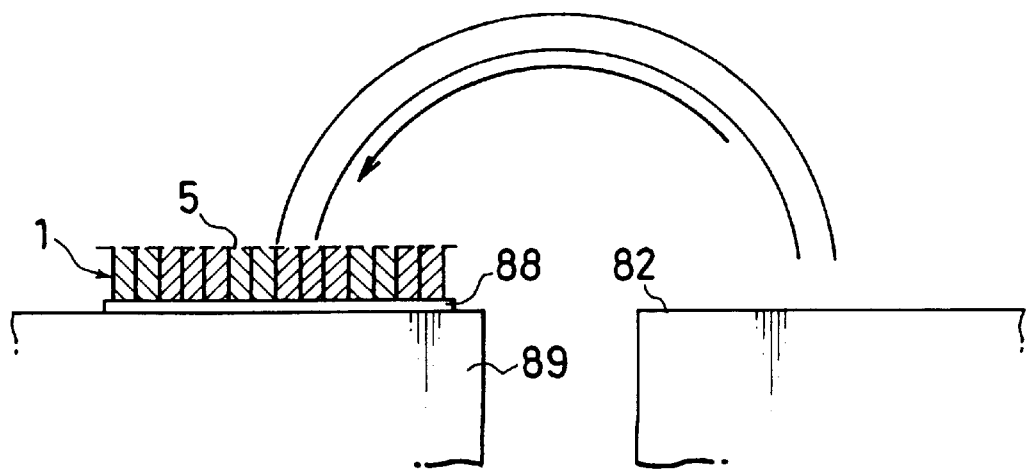
FIG. 38 is an explanatory view showing how the invertor of FIG. 37 inverts the retainer.

FIGS. 33 to 38 show a fifth embodiment of the molding apparatus for patterned shaped articles according to the invention. The apparatus uses a retainer 1 which, as shown in FIG. 28, is constituted as a cell body consisting of contiguous columnar subdivisions (cells) 8 of equal height. The retainer 1 has its bottom covered with an air-permeable unwoven cloth 5 and is supported on a support arm 81 which swings it along a semicircular path in such manner that the retainer 1 revolves together with the support arm 81 while simultaneously being rotated about its own axis. At the start, the retainer 1 lies horizontally on a table 82 with the unwoven cloth 5 between itself and the table. While it is in this position, a moving supply tank 83 moves over it and charges its cells with particles $M_1$ (FIG. 34). The support arm 81 then swings 90° while rotating the retainer 1 into an upright orientation at a position off the table 82. With the retainer 1 held in this position, a blow unit 84 is moved in laterally and stopped at the side of the retainer 1 covered with the unwoven cloth 5. The blow unit 84 has a large number of blow ports arranged in a matrix and equipped with computer controlled electric gates. The gates are controlled so that air from a compressor is blown onto the unwoven cloth 5 from selected ones of the blow ports. As a result, particles are removed from the corresponding cells of the retainer 1 in accordance with the pattern of the shaped article to be produced (FIG. 35). The particles blown out of the cells fall into a tray 85 that was moved to an appropriate position for this purpose together with the blow unit 84. Then, after the blow unit 84 has been moved back, the support arm 81 is swung 90° in the opposite direction to return the retainer 1 to its original position on the table 82, whereafter the empty cells are charged with a different kind of particles $M_2$ which are delivered through a supply nozzle 86 supported on a bridge-like XY frame. Next, a retaining plate 88 destined to serve as the base surface and initially resting on a table 89 is swung and simultaneously rotated by a swing arm 87 moving along the same path as the support arm 81 to place the retaining plate 88 on top of the retainer 1 (FIG. 37), whereafter both the swing arm 87 and the support arm 81 are swung together in the opposite direction to invert the retainer 1 and retaining plate 88 and place them on the table 89 (FIG. 38). Finally, only the retainer 1 is once again inverted and placed back on the table 82.

Since the particle supply nozzle 86 is connected by pipe with four particle tanks 90 for black particles and particles of the three primary colors each equipped with an electric gate and is also connected with a compressor upstream of the particle tanks 90, it is possible, by repeating the particle blow-removal and supply operations, to produce a pattern in multiple colors. In the interest of brevity, no detailed description will be given regarding the drive mechanisms of the arms, blow unit, XY frame, compressor or the like, the electric gate drive device, an optional vibrator or other auxiliary devices. The optional vibrator is for vibrating the retainer at the time of its removal so as to ensure neat extraction.

Figure 39:
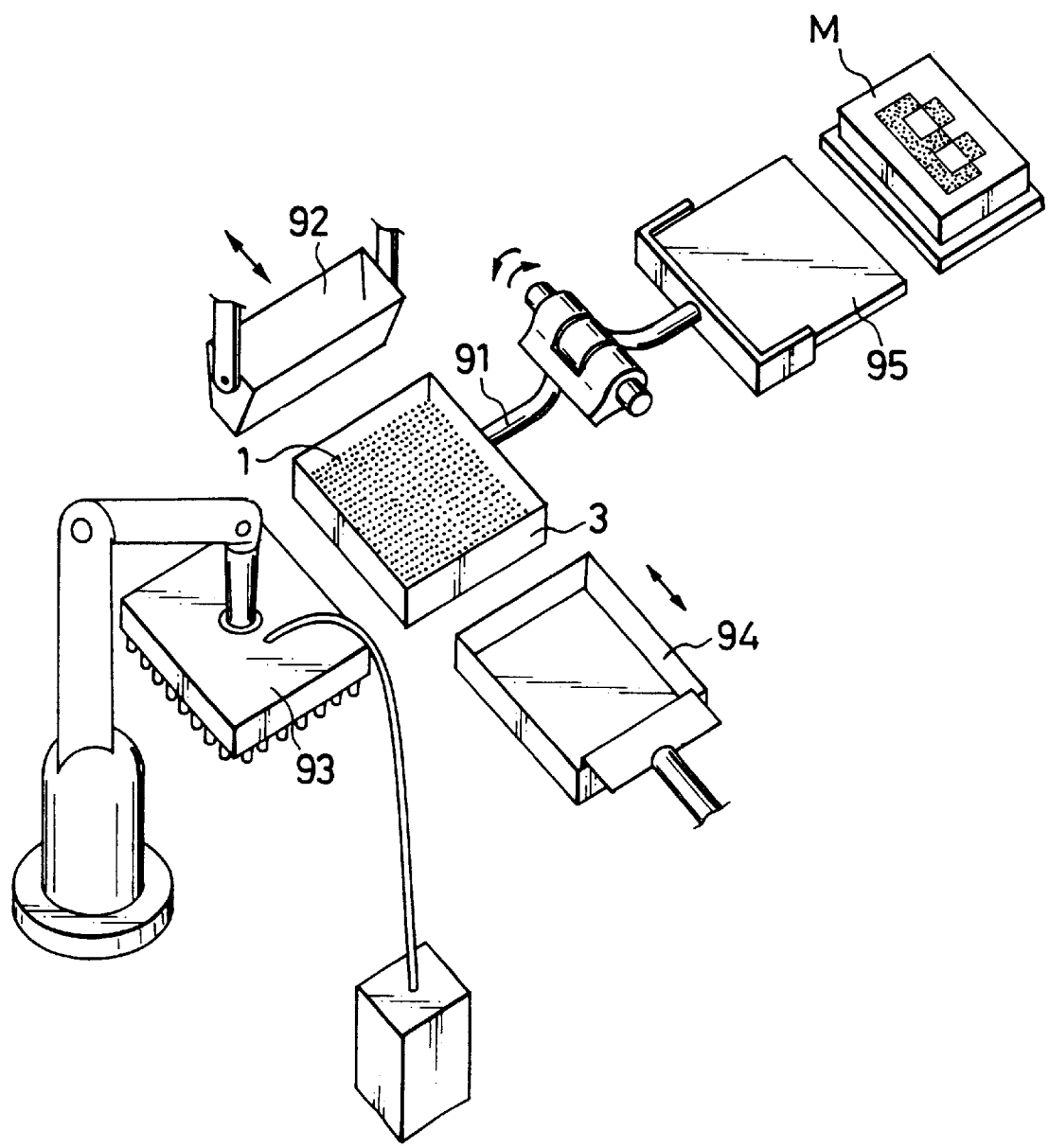
FIG. 39 is a perspective view of a sixth embodiment of the molding apparatus for patterned shaped articles according to the invention.

FIG. 39 shows a sixth embodiment of the molding apparatus for patterned shaped articles according to the invention. As the retainer 1, the apparatus uses a bristling body, which, as shown in FIG. 16, consists of a sheet covered with dense bristles. The bristling body is fixed to the bottom of a peripheral frame 3 which is supported by a support arm 91 for inverting it. The peripheral frame 3 is first charged with particles $M_1$ by a movable supply tank 92. Next, a suction unit 93 supported by a horizontal robot is placed on the peripheral frame 3. The suction unit 93 has a large number of suction ports arranged in a matrix, is connected with an aspirator and is equipped with computer controlled electric gates. The gates are controlled so that the suction ports suck particles from selected parts of the bristling body in accordance with the pattern to be produced. A squeegee type supply tank 94 then charges a different kind of particles $M_2$ into the empty spaces among the bristles, whereafter an invertible retaining plate 95 serving as a base surface is placed to cover the retainer 1 and the retainer 1 and retaining plate 95 are together inverted so as to transfer a particle course M onto the base surface. Finally, the peripheral frame 3 and the retainer 1 fixed thereon are once again inverted and returned to their initial position. The particle course M with the retaining plate 95 thereon is removed from the invertor and forwarded to the following processing step. In the interest of brevity, no detailed description will be given regarding the drive mechanisms of the supply tank, arms, aspirator, squeegee or the like, an optional vibrator or other auxiliary devices. The optional vibrator is for vibrating the retainer at the time of its removal so as to ensure a neat extraction.

Figure 40:
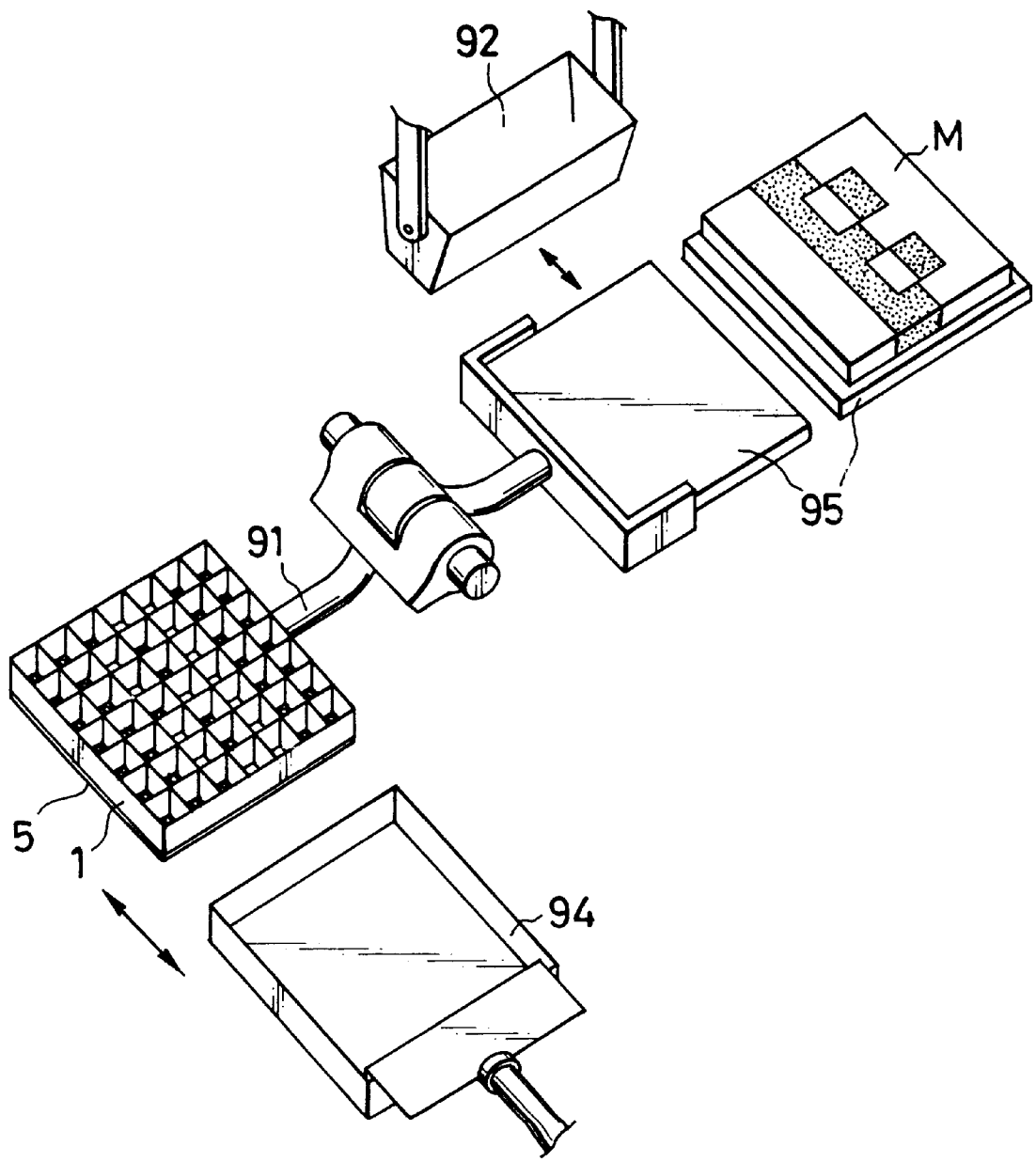
FIG. 40 is an explanatory view showing primary charging of particles into a retainer in the molding apparatus of FIG. 39.
Figure 41:
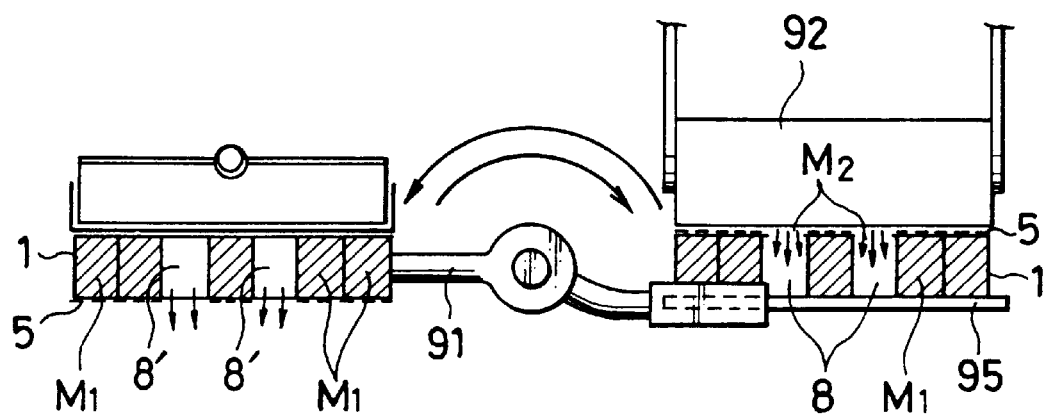
FIG. 41 is an explanatory view showing particle removal and secondary charging in the molding apparatus of FIG. 39.

As will now be explained with reference to FIG. 40, the method of removing the particles $M_1$ in the molding apparatus of FIG. 39 can be modified to the drop-removal method. In this case, a cell body having its bottom covered with a unwoven cloth 5 is attached to the invertible support arm 91 as the retainer 1. In the illustrated example, the unwoven cloth 5 is cut away at portions corresponding to the letter B (the pattern to be produced). All of the cells of the cell body are supplied with particles $M_1$ by the squeegee type supply tank 94 but the particles $M_1$ supplied to the cells at the cut-away portions of the unwoven cloth 5 simply fall through. The retaining plate 95 is then placed on top of the cell body and the retainer 1 is inverted, whereafter the empty cells at the cut-away portions of the unwoven cloth 5 are charged with a different kind of particles $M_2$ by the supply tank 92 (which has been transferred to the right side of the invertor as viewed in FIGS. 39 and 40), thereby producing a shaped article M (FIG. 41). The cell body is inverted and returned to its initial position by the support arm 91 and the retaining plate 95 with the shaped article M thereon is sent to the next processing step. Adoption of the drop-removal method makes it possible to produce shaped articles of a prescribed pattern at high speed. It also eliminates the need for the suction unit 93.

Figure 42:
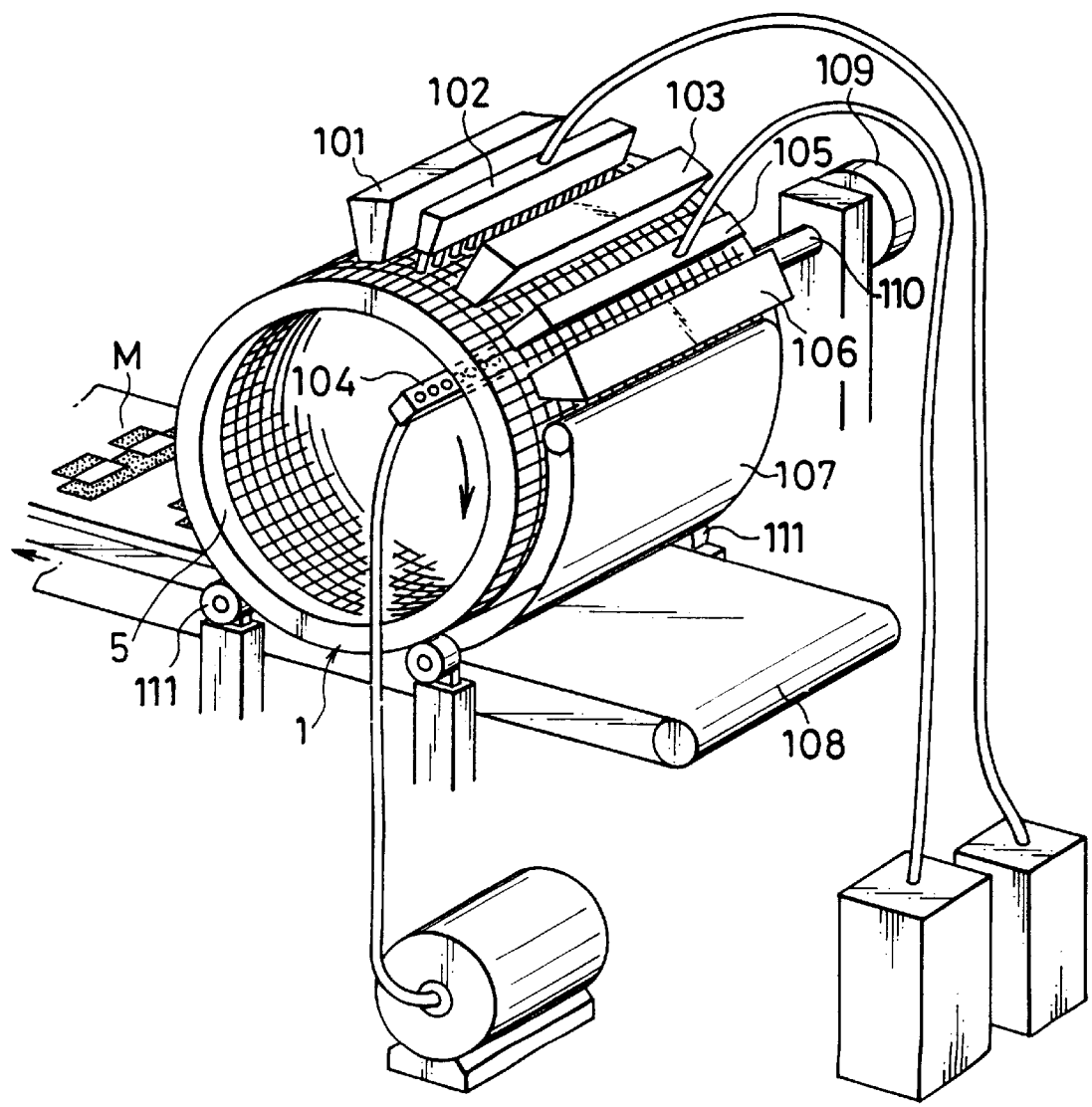
FIG. 42 is a perspective view of a seventh embodiment of the molding apparatus for patterned shaped articles according to the invention.

FIG. 42 shows a seventh embodiment of the molding apparatus for patterned shaped articles according to the invention. The apparatus uses a retainer 1 which, as shown in FIG. 28, is constituted as a cell body consisting of contiguous columnar subdivisions (cells) 8 of equal height, but in this embodiment the cell body is wrapped into a cylinder. The bottom of the retainer 1 is covered with an air-permeable unwoven cloth 5. The so-constituted endless cylindrical retainer 1 is rotatably supported. One end of the cylindrical retainer 1 is closed and provided with a shaft 110 directly connected with a rotation control motor 109. The other end of the cylindrical retainer 1 is open. Two pairs of bearings 111 are provided, one pair at the closed end and the other at the open end of the cylindrical retainer 1, for rotatable supporting the outer surface thereof. Positioned opposite the outer surface of the cylindrical retainer 1 and aligned in parallel with its axis are disposed in clockwise order (as viewed from the open end of the cylindrical retainer 1): a first fixed particle supply tank 101 for first supplying particles to the cylindrical retainer 1, a computer controlled suction unit 102 connected by pipe with an aspirator and having a large number of suction ports arranged in a single row to extend over the full width of the cylindrical retainer 1, a second fixed particle supply tank 103, a suction slit 105 connected with an aspirator, and a third fixed particle supply tank 106. In addition, a computer controlled blow unit 104 connected with a compressor and having a large number of blow ports arranged in a single row to extend over the full width of the cylindrical retainer 1 is disposed facing the inner surface of the cylindrical retainer 1 and in parallel with its axis at a position corresponding to that of the suction slit 105. After the first particle supply tank 101 has supplied particles $M_1$ to the cylindrical retainer 1 as it is being rotated clockwise as viewed from its open end, the suction unit 102 sucks the particles out of prescribed cells in a dot-like fashion in accordance with the pattern to be produced, the second particle supply tank 103 charges a different kind of particles $M_2$ into the cells that were removed of particles by suction, the blow unit 104 blows the particles $M_1$, $M_2$ out of prescribed cells in a dot-like fashion in accordance with the pattern to be produced and the suction slit 105 sucks up the blown-out particles, and the third particle supply tank 106 charges yet a different kind of particles $M_3$ into the cells that were removed of particles by blowing. A horizontal conveyor is disposed immediately under the cylindrical retainer 1 and a curved conveyor 107 is disposed along the surface of the cylindrical retainer 1 to extend from after the third particle supply tank 106 to near the horizontal conveyor 108. As the retainer 1 rotates, the cells charged with the three kinds of particles are covered by the conveyor 107 up to the point that the particles contained therein are released onto the horizontal conveyor 108, which serves as a base surface. The horizontal conveyor 108 carries the resulting particle course to the next processing step. In the interest of brevity, no detailed description will be given regarding the drive mechanisms of the conveyors, aspirator, compressor or the like, the electric gate drive device, an optional vibrator or other auxiliary devices. The optional vibrator is for vibrating the cylindrical retainer at the time of release of particles therefrom so as to ensure neat removal.

Although seven types of molding apparatuses were explained in the foregoing, the invention is not limited to these and various other embodiments are also possible by using different configurations, materials, operation modes and combinations of these. A few such additional embodiments will be described in the following discussion.

Retainers of various configurations, materials and combinations of configuration and material can be used. The auxiliary forms are not limited to the shape of a flower but can be any of various other shapes depending on the pattern to be produced. The cells of the cell body can be of any of various shapes including, but not limited to, polygonal (triangular, square, hexagonal, etc.) and circular. The subdivisions of the auxiliary form or cell body do not have to be continuous. Insofar as no problems arise in producing the pattern, they can be discontinuous or have gaps, in which case they become deformable. The bristles of the bristling body can be in the form of pins, small pieces, pile, loops, implanted, raised or attached hairs, pipes or various other configurations. The height of the retainer can be appropriately determined considering the desired thickness of the finished pattern. While the retainer does not necessarily have to be of the same height throughout, it is preferable if it is since this facilitates charging with particles. For simplicity, the foregoing explanation was made with respect to retainers having only a small number of cells or bristles. There is, however, no particular limit on the number of cells or bristles. When the cell size is made 1–2 mm, for example, it becomes possible to produce shaped articles with fine patterns consisting of from several tens of thousands to several million dot elements. As the material of the retainer there can be used metal, ceramic, plastic, rubber, paper, unwoven cloth, woven cloth, wood and the like. It is preferable to use a combination of materials that enables close contact between the base surface and the retainer because this ensures a well delineated pattern. The base surface is preferably formed of unwoven cloth, woven cloth, paper or some other material exhibiting air permeability, liquid permeability and/or liquid absorbing property. The advantage of such materials is that, since they promote the escape of entrained air and the removal of excess liquids they help to ensure the strength and uniformity of the shaped article and to prevent the particle course from losing its shape owing to friction between the particles and the retainer at the time the retainer is removed. The blow-removal method is advantageous in that the only control required is air control, that the disposition of the nozzles and the control for positioning them is simple owing to the small sizes to which the nozzle diameter and the mask openings can be reduced, and in that it is easily adaptable to high-speed operation. The blow-removal method can be conducted with the retainer standing, tilted or level, and can be used in conjunction with a suction device, as shown for example in FIGS. 1, 27 and 42. In the case of using blow-removal, it is preferable to use an air-permeable material for the bottom of the retainer at the time of particle charging. Examples of usable air permeable materials include various types of unwoven cloth made of, for example, metal, fiber, plastic, ceramic or rubber, as well as woven cloth, mesh, perforated sheet, perforated panel, porous sheet, porous panel and the like. Among these, unwoven cloth is preferable because it is easy to handle and inexpensive. During particle charging, the bottom of the retainer can either be integrally attached to the retainer as in FIGS. 1, 33 and 42 or be separate therefrom as in FIG. 27. Blow-removal can be conducted with respect to an upright retainer to produce a pattern without use of an air-permeable bottom. This is possible by using a removable bottom plate, separating the bottom plate from the retainer after the retainer has been stood upright (so that the particles rest as if occupying pigeon holes), conducting blow-removal, and then bringing the bottom plate back against the retainer. It is also possible to conduct blow-removal with respect to a retainer having an integral bottom plate. This is done, for example, by standing or tilting the retainer after it has been charged with particles (so that the particles rest as if occupying pigeon holes), removing the particles from predetermined portions of the retainer by blowing air from the open side of the retainer, returning the retainer to horizontal after the particles have been removed, charging a different kind of particles into the empty portions of the retainer to produce a pattern, and turning the retainer upside down onto a base surface.

Either blow-removal or suction-removal can be conducted with a single blow/suction port of slit or other configuration or with a plurality of ports arranged in a single row or in a matrix. Blow-removal and suction-removal can be conducted independently or in combination.

When the same pattern is to be produced repeatedly, use of a sheet-like mask is preferable from the point of achieving high productivity. On the other hand, use of a single blow/suction port or of a plurality of ports arranged in a single row or in a matrix is advantageous in that it enables direct computerized pattern formation with high productivity and also makes it possible to modify the pattern at will.

A sheet-like mask is used when particles are removed and/or when different particles are supplied into the empty portions. In the embodiment of the molding apparatus shown in FIG. 15, sheet-like masks are used only when the particles are removed. In this embodiment, since the lower surface of particle-course in the contact with the base surface becomes a finally finished front surface of a shaped article, even partial admixture of the different materials being supply with the first supplied materials at the upper surface of the particle course which becomes the rear surface of the shaped article. This is why the sheet-like masks are not used when the different materials are supplied into the empty portions. The embodiments shown in FIGS. 1, 24, 27, 33, 39 and 42 have a construction such that supply of materials, removal of the supplied materials and supply of different materials can be conducted without use of sheet-like masks, whereby the productivity is enhanced.

There is no particular limitation on the base surface. As the base surface it is possible to use the bottom of a form or, alternatively, a sheet, belt, board or the like, or even the bottom plate of a double action or other type press, or a belt conveyor or other such endless base surface. The particle course M can be placed on a board, sheet or other such base surface either as it is or as turned upside down. In the case of a retainer supported to be freely movable, a retainer supported to be movable vertically and horizontally and a retainer supported to be invertible, it is preferable to increase the height of the peripheral frame slightly and employ a base surface plate that fits snugly inside the retainer. The advantages of this arrangement are that the retainer can be easily inverted, that the base surface plate can be used as it is as a protective base plate for the shaped article after completion of the molding operation, and that when the base surface plate is formed to a size to fit into the die cavity of a double action press it becomes possible to achieve smooth removal of the retainer and ensure production of a high quality pattern on the base surface plate by disposing the particle-charged retainer and the base surface plate in the press and lowering the lower die to transfer the base surface plate and the particle course into the die cavity.

Varying the height and shape of the retainer and controlling the amount of particles supplied makes it possible to change the thickness of the particle course as desired, while varying the method of supporting the retainer makes it possible to shift between continuous sharp lines and diffused (blurred) lines. This, in conjunction with particle supply and suction control and the use of a continuous color blender for particle supply, enables the formation of a wide range of complex and sophisticated patterns. Use of a retainer constituted as a cell body or a bristling body (such as those illustrated in FIGS. 15, 27, 33, 39 and 42) makes it easily possible to represent photographs as resolved into dots, at high speed and in full color.

Vibrating the retainer during particle charging enables even feeding of particles, while vibrating it during retainer removal ensures neat extraction. Other elements of the molding apparatus can also be equipped with vibrators as required.

The gates, valves and other switching devices can be of various types such as electric, pneumatic and hydraulic. The types used and the positions at which they are installed can be decided in consideration of the required supply, blow-removal and suction-removal functions. Any such devices can, as required, be equipped with various auxiliary devices such as vibrators, static erasers and the like. In the case of a freely movable retainer, the means for removing the retainer from the particle course can be of any of various types, including, for example, magnetic, adhesive, clamping, screw, insertion, hook, vacuum, or air-suction type.

For removing any excess particles remaining on the surface of the retainer after particle charging, the retainer can be used in combination with a brush, suction or other type cleaning device for ensuring production of a good quality pattern.

The overall configuration of the molding apparatus is not limited to the examples shown in FIGS. 1–42 but can additionally include articulated robots, like those shown in FIGS. 24, 27 and 39, as well as various positioning devices. It is also possible to combine various methods, devices, auxiliary equipment and the like for enabling the particle charging and removal operations to be conducted in several cycles so as to enable use of several types of particles. Moreover, for obtaining a product more suitable for the ensuing processing steps, any of various compression molding apparatuses can be incorporated into the invention, such as shown in FIG. 24. It is also possible to integrate a plurality of particle supply devices into a single molding apparatus. This makes it possible to form a backing course and a pattern course with the same apparatus and to produce a particle course with different patterns on the front and back. In addition, the apparatus can be combined with particle course formation means such a squeegee type course forming apparatus or with a sliding supply tank that supplies particles while sliding over the form, a supply tank with a slitted nozzle, a rotary feeder, a device employing an endless honeycomb belt or the like or an endless pile belt or the like.

Figure 43:
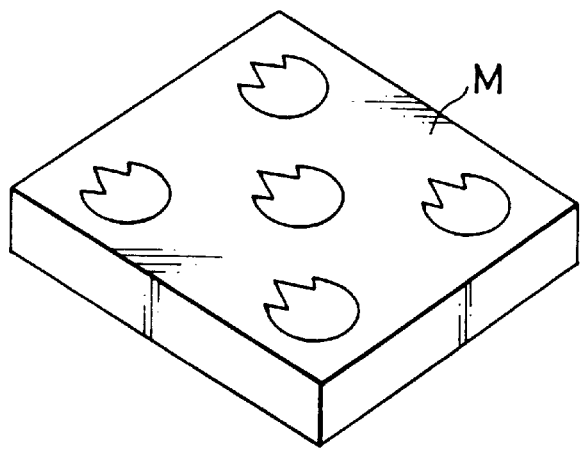
FIG. 43 is a perspective view of a first example of a shaped article produced by the molding apparatus according to this invention.

Although any of the molding apparatuses shown in FIGS. 1 to 42 can be used to produce a shaped article with the pattern shown in FIG. 43, specific examples of using the apparatuses of FIGS. 1, 24 and 39 for this purpose will be explained. The shaped article of FIG. 43 is patterned on both its front and back surfaces with red courses representing tulips distributed within a white course. When this shaped article is produced using the molding apparatus of FIG. 1, a course of white particles is first formed throughout the retainer 1 using the squeegee type supply tank 12. Next, the retainer 1 is scanned by the nozzle 14 for blowing the particles out of five of the nine the auxiliary forms 2. Specifically, the particles are removed only from the auxiliary forms 2 at the four corners and the auxiliary form 2 at the center. The supply tank 17 then charges red powder into the five empty auxiliary forms 2, and the invertor 18 inverts the result to produce a particle course M on the retaining plate 19. When the apparatus of FIG. 24 is used to produce the same shaped article, the left and right squeegee type supply tanks 53 and 56 are filled with white and red powders, a white powder course is formed throughout the retainer, the robot is operated for sucking the powder out of only the auxiliary forms 2 at the four corners and the auxiliary form 2 at the center, red powder is charged into the empty auxiliary forms, and the result is sent into the double action press together with the base surface plate. Production of the same shaped article using the apparatus of FIG. 39 also involves the operations of forming a powder course, suction-removing a part of the course and charging a different powder into the removed portions. However, since a bristling body is used as the retainer and the pattern is produced by dot-like suction-removal, the pattern borders appear to be dotted. The shape of the powder course supplied onto the base surface in any of the foregoing ways is provisionally or finally set on the base surface. This can be achieved by adding water, solvent, lubricant-bonding agent, curing promoter or the like, by compressing, heating or sintering the particles, or by a combination of these methods. The method to be used is selected in light of the nature of the particles. The base surface can be a fixed plate or a conveyor or the like. It can also be the bottom plate of a form, setter or the like. It can be fabricated in the final size from the beginning or can be cut from a larger plate. Further, particles can be supplied from a supply apparatus onto the bottoms of a large number of forms or setters arranged below it.

Figure 44:
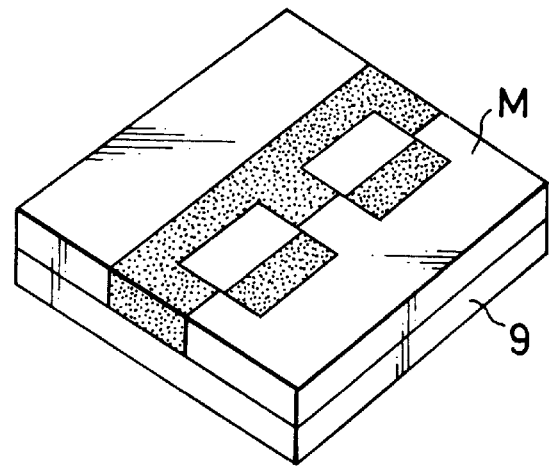
FIG. 44 is a perspective view of a second example of a shaped article produced by the molding apparatus according to this invention.

Although of the molding apparatuses shown in FIGS. 1 to 42 can be used to produce a shaped article with the pattern shown in FIG. 44, specific examples of using the apparatuses of FIGS. 27, 33 and 39 for this purpose will be explained. In the shaped article of FIG. 44 a pattern course with the character B expressed in dots is formed on top of a backing course 9. More specifically, the pattern course consists of a white course containing a black course representing the letter B and has the backing course 9 underneath. The powder for forming the backing course can be of any kind enabling it to be constituted as an integral body and may be the same as or different from that of the pattern course. A backing course formed on a fixed table, conveyor or the like in advance can be used as the base surface. When the apparatus of FIG. 27 is used, white particles are supplied into the retainer 1 by the squeegee type supply tank 74, air is blown from underneath onto the mask 73 formed of unwoven cloth with portions cut away in the shape of the letter B thereby removing the white powder from the corresponding cells, and the empty cells removed of the white powder in this way are charged with black powder from the supply nozzle 78. For enabling formation of the backing course on top of the pattern course, the retainer 1 is provided with a peripheral frame that is higher than the cell body by the amount required for forming the backing course, a squeegee type supply tank 74 of a size able to fit snugly within the peripheral frame is used, and an arrangement is provided for making the supply tank 74 adjustable between two levels during particles charging. When the apparatus of FIG. 33 or 39 is used, no mask is required. Instead, the letter B is formed by blowing or sucking out particles in accordance with data from a computer. Although not shown in the drawings, it is possible to integrate a plurality of particle supply devices into a single apparatus so that the backing course can be formed together with the pattern course in the same apparatus and that different patterns can be formed on the front and back of the shaped article. The shape of the powder course supplied onto the base surface in any of the foregoing ways is provisionally or finally set on the base surface. This can be achieved by adding water, solvent, lubricant-bonding agent, curing promoter or the like, by compressing, heating or sintering the particles, or by a combination of these methods. The method to be used is selected in light of the nature of the particles. The base surface can be a fixed plate or a conveyor or the like. It can also be the bottom plate of a form, setter or the like. It can be fabricated in the final size from the beginning or can be cut from a larger plate. Further, particles can be supplied from a supply apparatus onto the bottoms of a large number of forms or setters arranged below it.

Figure 45:
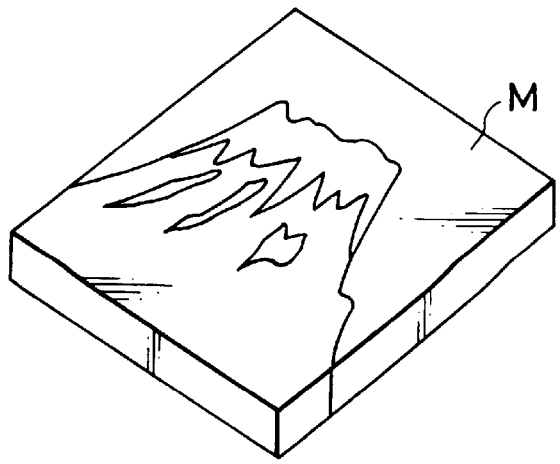
FIG. 45 is a perspective view of a third example of a shaped article produced by the molding apparatus according to this invention.

When the invention is to be used for producing a shaped article formed on its front and back surfaces with a scenic pattern obtained by resolving a photograph into dots, such as that shown in FIG. 45, one of the apparatuses shown in FIG. 15 or FIGS. 27–42 is used. In the interest of brevity, the production of the shaped article of FIG. 44 will be explained only with respect to the apparatuses of FIGS. 15, 33 and 42, which are capable of supplying three or more kinds of particles. In the case of FIG. 15, the bristling body constituting the retainer 1 is first charged with sky-blue particles for representing the sky. Next, a screen mask 33 prepared from a photograph to have an opening representing a mountain is placed on top of the retainer 1, the suction port 34 is moved over the mask 33 to suck particles from the part of the retainer 1 corresponding to the mountain pattern, the scanning type supply tank 35 charges the portions removed of particles with brown particles representing a mountain, a portion representing snow is similarly produced by particle removal and charging, the retainer 1 is sent to and inverted by the invertor 39, the retainer 1 is removed after inversion, and the particles course is forwarded to the following processing step. Production of the shaped article of FIG. 45 by the apparatus of FIG. 33 or 42 differs from that by the apparatus of FIG. 15 in that the scenic pattern data obtained by resolving a photograph is first stored in a computer memory. In the case of the apparatus of FIG. 33 the pattern is produced by applying the computer data to the large number of blow ports arranged in a matrix and equipped with computer controlled electric gates, while in the case of FIG. 42 it is similarly produced by applying the data to the large number of linearly arranged suction ports and the large number of linearly arranged blow ports. The treatment for setting the particles is the same as that described earlier with reference to FIGS. 43 and 44.

In all cases, the molding apparatus and method used for producing the pattern can be freely selected. By combining different apparatuses with various pattern forming methods it is possible to produce shaped articles with various patterns in addition to those described in the foregoing. Moreover, even where a shaped article with one and the same pattern is to be produced, it can be produced in various different ways so that there is considerable choice in the selection of the molding apparatus and the method of pattern formation. In any event, it is always possible to produce a well-defined pattern by controlling the amount of particles supplied and, if suction or blowing is used in parallel, by also controlling the amount of suction or blowing. As the material for the base surface it is preferable to use rubber, sponge, paper, unwoven fabric or other somewhat bulky or elastic material. This is because when the retainer of the molding apparatus is pressed onto a base surface formed of such a material the bulk or elasticity of the material enables absorption of the play between the base surface and the bristles or partitions (cell walls or auxiliary forms), which in turn makes it easier to position the form in the vertical direction. Moreover, since the bristles or partitions are able to define the pattern spaces more distinctly, it becomes possible to form sharper pattern lines. A similar effect can also be obtained by depressing the retainer support member with a spring or an elastic body made of rubber or the like or by attaching thread, string or other such elastic material at the contacting surfaces between the retainer and the base surface. In all embodiments, it is preferable to use particles obtained by adding a coloring agent such as a pigment or colorant to a base material so that colorful patterns can be produced by continuous color blending. As in dyeing, it is preferable to proceed from lighter to darker colors since this reduces the effect from the mixing of coloring materials. In the case of the apparatus of FIG. 33, for example, it is preferable to use base particles for the course formed on the base surface beforehand and then reuse the blown or sucked out base particles as pattern particles after they have been added with a coloring material such as a colorant, pigment, coloring agent, metal or other mineral substance or with any of various powders or granules of, for example, rock or ceramic. The advantage of this is that it enables subtle differences in color to be produced continuously and, further, means that the only material with which the supply apparatuses have to be supplied in advance is coloring material.

In all configurations, it is preferable to impart vibration to the retainer because doing so enables more even charging and feeding of the particles and, by promoting particle cave-in at the regions from which the partition member is extracted, makes it possible to form highly compacted shaped articles.

Shaped articles can be produced individually or, alternatively, it is possible first to cause a plurality of shaped articles to set as one large one and later cut them into the individual articles. In addition, various complex patterns including ones resembling the jointed pattern of natural stone can be produced by forming a plurality of patterned courses one on top another, allowing the courses to set into an integral mass, and then cutting the mass from top to bottom.

In the method of the present invention, dry particle material is used for forming the pattern course on the base surface. Although the material is dry, it may have absorbed one or more of water, oil, lubricant-bonding agent, solvent, a setting agent or a plasticizer, if it is not kneaded with water, oil, lubricant-bonding agent, solvent, setting agent or plasticizer and is in a dry state readily amenable to pulverization for supply to the base surface. On the other hand, the material of which the backing layer is formed may be either dry or wet with one or more of water, oil, lubricant-bonding agent, solvent, setting agent and plasticizer. Otherwise, a plate of metal, wood, cement, glass or ceramic or a sheet of paper, unwoven fabric, woven fabric, knit fabric, plastic, etc. may be used as the backing layer. In this case, the plate or sheet serves as the base surface. In addition, any other existing shaped article may be used as a base surface to be formed with a pattern course that is set together therewith.

The materials to be supplied may differ from one another depending on the shaped article to be produced. Otherwise, in the finished state they are required to differ from one another in terms of color, luster texture and the like.

In producing a concrete shaped article, the pattern course material is dry and consists mainly of cement powder, resin or a mixture thereof and may additionally include at least one of a pigment and fine aggregates. The material for a backing layer consists mainly of cement powder, resin or a mixture of cement powder and resin, the mixture further containing a fine aggregate and, if necessary, additionally containing a pigment and at least one of coarse aggregates and various kinds of fibers. The backing material may either be dry like the pattern material or in the form of a concrete slurry obtained by kneading with water etc.

Both the materials for the pattern course and the material for the backing layer may additionally include wood chips as aggregates or fine aggregates and may further include as blended therewith crushed or pulverized granite, crushed or pulverized marble, slag, light-reflecting particles, inorganic hollow bodies such as Shirasu balloons, particles of ceramics, new ceramics, metal, ore or other substances. They may also contain as additives a congealing and curing promoter, a waterproofing agent, an inflating agent and the like. The aforementioned various kinds of usable fibers include metal fibers, carbon fibers, synthetic fibers, glass fibers and the like.

All the materials are supplied to a form and are allowed to set into an integral mass. Otherwise after the material has been supplied, water is supplied to all portions of the interior of the form, thereby setting the materials into an integral mass within the form. If a wet material is used for the backing layer, the amount of water supplied is reduced in view of the water contained in the wet material. When a plate of metal, wood, cement, glass or ceramic or a sheet of paper, unwoven fabric, woven fabric or knit fabric is used as the backing layer, for example, it can be allowed to set integrally with the pattern course. An asphaltic concrete shaped article can be produced using a thermal fusion material such as asphalt.

In producing an artificial stone shaped article, the dry materials for the pattern course may, for example, be constituted of at least one of rock particles, ceramic particles, new ceramic particles, glass particles, plastic particles, wood chips and metal particles and may, as found necessary, further have mixed therewith a pigment etc. Also, the material for the backing layer may, for example, be constituted of at least one of rock particles, ceramic particles, new ceramic particles, glass particles, plastic particles, wood chips and metal particles and may, as found necessary, further have mixed therewith a pigment etc. The material for the backing layer may be either dry or wet. The wet material for the backing layer contains a setting agent. The setting agent contained in the wet material for the backing layer or a setting agent for setting the dry materials for the pattern course and/or the dry material for the backing layer is composed mainly of a mixture of cement powder and water, a mixture of cement powder, resin and water, a mixture of resin and water, a mixture of resin and solvent, or a mixture of resin, water and solvent and may further contain particles of at least one of rock, ceramic, new ceramic, glass and plastic and may, as found necessary, be kneaded with a pigment or colorant and have mixed therewith various kinds of particles, various kinds of fibers, various kinds of mixing agents and various kinds of additives. The various kinds of particles include particles of slag, fly ash and fine light-reflecting substances. The various kinds of fibers include metal fibers, carbon fibers, synthetic fibers and glass fibers. The various kinds of mixing agents and additives include shrink proofing agents, congealing and setting agents, delaying agents, waterproofing agents, inflating agents, water reducing agents, fluidizing agents and the like.

For enhancing the adherence of the setting agent with the aforementioned dry materials, the dry materials can be sprayed with or immersed in water, solvent or surface treatment agent, but are not kneaded with water, solvent or surface treatment agent and are in a state readily amenable to pulverization.

All the materials can be set into an integral mass within a form etc. by vacuum-suction treatment, centrifugal treatment or other such treatment for spreading the setting agent between adjacent particles or by using a mixture of an aggregate and a setting agent as the material for the backing layer. When a plate of metal, wood, cement, glass or ceramic or a sheet of paper unwoven fabric, knit fabric, woven fabric or plastic is used as the backing layer, the pattern course can be allowed to set integrally therewith.

For producing a ceramic shaped article or the raw product for a ceramic shaped article, the dry materials for the pattern course are mainly particles of one or more of clay, rock, glass, new ceramic, fine ceramic and glaze with or without a pigment or colorant added thereto. The materials may be ones which have absorbed some water or been added with a lubricant-bonding agent after drying but they are not kneaded with the lubricant-bonding agent or water and are in a state readily amenable to pulverization. The material for the backing layer is constituted mainly of particles of one or more of clay, rock, glass, new ceramic and fine ceramic and may additionally contain a pigment and a colorant. In the finished state, the backing layer is required to differ from the pattern course in color, luster, texture and the like and may be either dry, similarly to the pattern course, or made wet by kneading with water or a lubricant-bonding agent. In addition, either the materials for the pattern course or the material for the backing layer may have further mixed therewith inorganic hollow bodies such as Shirasu balloons, and particles of ceramic, metal or ore and may have added thereto various kinds of foaming agents, fluidization-preventing agents, supernatant agents, lubricating agents, bonding agents and adherence promoters as additives.

The materials supplied into a form etc. are allowed or caused to set into an integral mass without adding or by adding a predetermined amount of water or lubricant-bonding agent to plasticize them and applying pressure to the resultant mixture. The set integral mass is removed from the form etc. and used as a raw product. The raw product is sintered to obtain a ceramic shaped article. Otherwise, the materials supplied into a refractory setter or similar form are melted or fused by heating to obtain an integral mass, and the integral mass is removed from the setter. In the case of a shaped article of enamel, stained glass or crystalline glass the material for the pattern course is laid on a plate of metal, glass or ceramic and melted or fused by heating to be made integral with the plate.

In producing a raw product to be sintered into a metal shaped article, the dry materials for the pattern course are mainly particles of one or more of metals and alloys and may, as found necessary, further have mixed therewith a lubricant. The materials may be ones which have absorbed the lubricant after drying but they are not kneaded with the lubricant and are in a state readily amenable to pulverization. The materials for the backing layer are constituted mainly of particles of one or more of metals and alloys and may be either dry or made wet by kneading with a lubricant.

Examples of the lubricant used herein include zinc stearate and other lubricants. The dry materials for the pattern course or the materials for the backing layer may further contain a bonding agent and other additives.

All the materials are supplied into a main form etc., pressed therein and removed therefrom to obtain the raw product for a metal shaped article. The raw material is sintered into a metal shaped article. A metal shaped article may be produced by supplying all the materials onto a sheet of metal, glass, ceramic, etc., applying pressure to the resultant composite to obtain an integral mass of raw product and sintering the integral mass.

The dry materials for the pattern course used in producing a shaped article having an impasto layer are various kinds of powdered paint, and the material for the backing layer is a plate or the like of metal, wood, cement or ceramic. The various kinds of powdered paint include acrylic resin, polyester resin, acrylic-polyester hybrid resin, fluorine resin and similar resins having a pigment or colorant added thereto. The materials for the pattern course are laid on the plate as a backing layer and melted and fused by heating to unite the two layers together. In uniting the two layers together, pressure may be applied to the layers. As a result, it is possible to obtain a plate having an impasto layer thereon.

In producing a plastic shaped article, the dry materials for the pattern course are constituted mainly of particles of various kinds of plastics and may additionally contain a pigment or a colorant. The materials may also contain a plasticizer or solvent, but are not kneaded with a plasticizer or solvent and are in a state readily amenable to pulverization. The material for the backing layer may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, acrylonitrile-butadiene-styrene, polypropylene oxide, ethylene-vinyl acetate copolymer, fluorine resin and other thermoplastics and thermosetting resins. Both the materials for the pattern course and the material for the backing layer may, as found necessary, contain a foaming agent, oxidization preventing agent, thermal stabilizer, bridging agent, other additives and particles of inorganic materials and the like. All the materials are melted or fused into an integral mass by heating, while applying pressure thereto, if necessary. With this method, it is possible to produce a patterned shaped article of foamed styrol, a patterned shaped bathtub or floor tiles of plastic, etc. In this case, the two layers may be united with a plate of metal, wood, cement, ceramic or a sheet of paper, unwoven fabric, knit fabric, woven fabric or plastic.

In producing confectionery or other shaped foodstuffs, the dry materials for the pattern course are constituted mainly of particles of one or more of wheat, rice, potato, bean, corn and sugar and may additionally contain seasonings and spices. The materials may also contain oil or water, but are not kneaded with oil or water and are in a state readily amenable to pulverization. The material for the backing layer may be either dry, similarly to the materials for the pattern course, or made wet by kneading with oil or water. Both the materials for the pattern course and the material for the backing layer may, as found necessary, further contain an inflating agent and other additives. All the materials are supplied into a form etc. and are allowed to set or caused to set by adding water or oil to plasticize them into an integral mass. The integral mass is pressed and then removed from the form to obtain a raw product. The raw product is then baked. Otherwise, all the materials are baked within the form etc. With this method, it is possible to produce various patterned baked confectioneries. It is also possible to produce a patterned shaped article melted by heating, such as a patterned chocolate shaped article etc., by using particles of the material melted by heating, such as chocolate etc., and melting and fusing the particles by heating.

The materials that can be used in the present invention are not limited to those set out as examples herein and various other materials can also be used depending on the shaped article to be produced. Moreover, the range of patterned shaped articles that can be produced can be increased by combining various materials that, in the finished state, differ in property, color, luster, texture and the like. When the methods described above have the steps in common with each other, different kinds of materials can be combined with each other. For example, since both the method for producing a metal shaped article and the method for producing a ceramic shaped articl require a common sintering step, metal particles and ceramic particles are used together to form a pattern, whereby cloisonne ware can be produced. The materials used in the method for producing a concrete shaped article and those used in the method for producing an artificial stone shaped article can also be used together.

In the method for producing any of the patterned shaped articles, it is desirable to apply vibration when the materials are supplied onto the base surface so as to ensure smooth movement of the materials. Further, by rubbing with a brush or comb or applying a jet of air or water to the boundary portion between the different kinds of materials for the pattern course, the pattern can be blurred.

In addition, by providing on the base surface or pattern course a mat of unwoven fabric, papr or other water or oil absorbing material, any excess amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, degassing is enhance to obtain a dense article. By vibrating or pressing one or both of the pattern course and the backing layer when the two layers are being allowed to set into an integral article, the integral article obtained becomes dense and is improved in strength. The article may be reinforced with long fibers, short fibers, wire nets or reinforcing rods by inserting these in or between the two layers. The method of using an article obtained by the sheet making method or extrusion molding method or any of various plates or sheets as the backing layer is applicable to the production of various carticles including architectural panels and boards, wall sheets and tiles. The surface of an existing concrete article can be used as the base surface. In this case, the materials for the pattern course are discharged onto the concrete surface and set to be integral with the existing concrete article.

In the method of producing a shaped article according to this invention, it is possible to produce a shaped article with a curved finished surface by using a deformable mat as the base surface or using a partially or generally deformable form.

As is clear from the foregoing description, in accordance with the present invention, the pattern course corresponding to the background, which accounts for large part of the overall pattern area, is formed all at one time, thus speeding up this part of the operation. Next, portions of the charged particles are removed at high speed by drop-removal, blow-removal or suction-removal and the portions removed of particles are then charged with particles of a different kind. Owing to this arrangement, it becomes possible to produce shaped articles at a much higher speed that could ever have been envisioned based on the prior art. Since the suction-removal and blow-removal methods are readily adaptable to computer control, moreover, the invention enables all types of patterns, whether large or small, to be produced using computer software. In addition, both the original base particles and the particles recovered by suction or blowing after once being charged can be added with a colorant or the like on the spot. As this makes it possible to continuously vary the color of the pattern, it provides a substantial improvement in efficiency.

By these production methods, it is possible to easily produce concrete shaped articles, artificial stone shaped articles, raw products for sintering into ceramic shaped articles, patterned metal shaped articles, impasto shaped articles, plastic shaped articles and shaped foodstuffs including confectionery each having a pattern of a prescribed thickness formed on part or all of the surface thereof. Therefore, the patterned shaped articles can maintain their patterns in excellent condition even when exposed to surface abrasion. Since the pattern layer is formed by a combination of various kinds of dry materials, the materials can, owing to their cave-in action, be densely charged without any gaps and the boundaries between adjacent materials can be minutely expressed. The pattern formed is thus very clear-cut.

Further, by incorporating supply tanks or nozzles that enable formation of randomly blended particle layers along with preprocessing devices and the like it becomes possible to form sharp patterns within a complex background pattern. For example, by applying this technique in forming the sky portion of the scenic pattern of FIG. 45 it becomes possible to produce the sky pattern as a subtle intermixing of blue sky and clouds at the same time as faithfully producing the pattern portion obtained by resolving a photograph. In addition, it is also possible to disturb the charged particles either at the boundaries between them or as a whole after the particles have been charged. Doing this enables the production of shaped articles which resemble marble or other kinds of natural stone and thus further contributes to the complexity of the patterns that can be formed by the molding apparatus for pattern shaped articles according to the invention.

In the case of the production of either a raw product for a ceramic shaped article or a ceramic shaped article, it is possible to produce various kinds of large capacity elements, circuits, antennas, etc. with ease by combining at least two kinds of materials for an insulator, conductor, semiconductor, dielectric, piezoelectric device, magnetic substance, etc.

By using the molding apparatus according to this invention to shape foundry sand or metal powder it is possible to produce a mold or a patterned sintered metal shaped article with the same high speed.

Furthermore, when the produced article is used as an architectural plate, since the plate maintains its pattern even after chamfering, cutting treatment can be effected without any restriction.

What is claimed is:

1. An apparatus for molding a patterned shaped article, comprising:

a retainer having a plurality of retaining portions for retaining particles;

first means disposed above the retainer for charging first particles into the retaining portions;

removal means disposed in proximity with the retaining portions charged with the first particles for removing the first particles from prescribed retaining portions of the retaining portions charged with the first particles;

second means disposed above the retainer for charging second, different particles into the prescribed retaining portions from which the particles were removed;

means for releasing the first and second particles retained by the retainer onto a base surface; and means for setting the first and second particles released on the base surface into an integral mass.

2. An apparatus according to claim 1, wherein said removal means comprises a suction device.

3. An apparatus according to claim 1, wherein said removal means comprises a blowing unit.

4. An apparatus according to claim 1, wherein said removal means comprises an invertor for turning the retainer upside down.

5. An apparatus according to claim 1, wherein said removal means comprises a suction device and a blowing unit.

6. An apparatus according to claim 1, wherein said removal means comprises a suction device and an invertor for turning the retainer up side down.

7. An apparatus according to claim 1, wherein said removal means comprises a blowing unit and an invertor for turning the retainer upside down.

8. An apparatus according to claim 1, wherein said removal means comprises a suction device, a blowing unit and an invertor for turning the retainer upside down.

9. An apparatus for molding a patterned shaped article, comprising:

a retainer having a plurality of retaining portions;

a first charging mechanism disposed above the retainer and charging first particles into the retaining portions;

a remover member disposed in proximity with the retaining portions charged with the first particles, said remover member removing the first particles from prescribed retaining portions of the retaining portions charged with the first particles;

a second charging mechanism disposed above the retainer and charging second, different particles into the prescribed retaining portions from which the first particles were removed;

a release mechanism releasing the first and second particles retained by the retainer onto a base surface; and a mechanism setting the first and second particles released on the base surface into an integral mass so as to form the patterned shaped article.

10. An apparatus according to claim 9, wherein said remover member comprises a suction device.

11. An apparatus according to claim 9, wherein said remover member comprises a blowing unit.

12. An apparatus according to claim 9, wherein said remover member comprises an invertor turning the retainer upside down.

13. An apparatus according to claim 9, wherein said remover member comprises a suction device and a blowing unit.

14. An apparatus according to claim 9, wherein said remover member comprises a suction device and an invertor turning the retainer upside down.

15. An apparatus according to claim 9, wherein said remover member comprises a blowing unit and an invertor turning the retainer upside down.

16. An apparatus according to claim 9, wherein said remover member comprises a suction device, a blowing unit and an invertor turning the retainer upside down.

* * * * *